(12) United States Patent
Endo et al.

(10) Patent No.: US 7,944,605 B2
(45) Date of Patent: May 17, 2011

(54) COLOR DISPLAY APPARATUS

(75) Inventors: Taro Endo, Tokyo (JP); Yoshihiro Maeda, Tokyo (JP); Akira Shirai, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 110 days.

(21) Appl. No.: 12/383,711

(22) Filed: Mar. 26, 2009

(65) Prior Publication Data

US 2009/0190045 A1   Jul. 30, 2009

Related U.S. Application Data

(63) Continuation-in-part of application No. 12/315,464, filed on Dec. 3, 2008, and a continuation-in-part of application No. 11/894,248, filed on Aug. 18, 2007, now Pat. No. 7,835,062, and a continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/841,173, filed on Aug. 30, 2006.

(51) Int. Cl.
    *G02B 26/00* (2006.01)

(52) U.S. Cl. .................... 359/295; 359/290; 359/291
(58) Field of Classification Search .................. 359/318, 359/290–298, 224.1
    See application file for complete search history.

(56) References Cited

U.S. PATENT DOCUMENTS

| | | | |
|---|---|---|---|
| 2,393,235 A | 2/1944 | Cawein | 348/743 |
| 5,371,543 A | 12/1994 | Anderson | 348/743 |
| 5,448,314 A * | 9/1995 | Heimbuch et al. | 348/743 |
| 5,592,188 A | 1/1997 | Doherty | 359/618 |
| 5,933,183 A * | 8/1999 | Enomoto et al. | 347/241 |
| 6,324,006 B1 * | 11/2001 | Morgan | 359/618 |
| 6,445,505 B1 | 9/2002 | Morgan | 348/743 |
| 6,567,134 B1 | 5/2003 | Morgan | 348/270 |
| 6,576,496 B1 * | 6/2003 | Bolken et al. | 438/110 |
| 6,825,969 B2 * | 11/2004 | Chen et al. | 359/290 |
| 6,972,777 B2 | 12/2005 | Shigeta | 345/690 |
| 7,046,221 B1 | 5/2006 | Malzbender | 345/82 |
| 7,755,830 B2 * | 7/2010 | Ishii et al. | 359/290 |
| 2004/0125347 A1 * | 7/2004 | Patel et al. | 353/98 |

* cited by examiner

*Primary Examiner* — Mohammed Hasan
(74) *Attorney, Agent, or Firm* — Bo-In Lin

(57) ABSTRACT

A color display apparatus includes a color changeover unit for changing over colors of an illumination light or a projection light, and a control circuit for applying a video signal for generating a control signal for controlling a spatial light modulator, wherein the control circuit further applying the video signal for generating a control signal during a transition period when the illumination and/or the projection light are projected with a first color coexisting with a second color as the color changeover unit changing over the colors of the illumination light or projection light from the first color to the second color.

20 Claims, 26 Drawing Sheets

COLOR DISPLAY APPARATUS

CROSS REFERENCE TO RELATED APPLICATIONS

This application is a Continuation in Part (CIP) Application of a Co-Pending patent application Ser. No. 12/315,464 filed on Dec. 3, 2008 and another application Ser. No. 11/894, 248 filed on Aug. 18, 2007 now U.S. Pat. No. 7,835,062 by one of common Inventors of this patent application. Applications 11/894,248 is a Non-provisional Application of a Provisional Application 60/841,173 filed on Aug. 30, 2006. The Non-provisional Application 11/894,248 is a Continuation in Part (CIP) Application of U.S. patent application Ser. No. 11/121,543 filed on May 4, 2005, now issued into U.S. Pat. No. 7,268,932. The application Ser. No. 11/121,543 is a Continuation in part (CIP) application of three previously filed Applications. These three Applications are 10/698,620 now abandoned; 10/699,140, now issued into U.S. Pat. No. 6,862, 127; and 10/699,143, now issued into U.S. Pat. No. 6,903, 860. All three patents were filed on Nov. 1, 2003 by one of the Applicants of this patent application. The disclosures made in these patent applications are hereby incorporated by reference in this patent application.

BACKGROUND OF THE INVENTION

1. Field of the Invention

The present invention relates generally to a video display apparatus and a method for controlling the apparatus. More particularly, this invention relates to a color video display apparatus implemented with at least one spatial light modulator to operate synchronously with a color changeover device applying a color sequential method.

2. Description of the Related Art

Even though there have been significant advances made in recent years in technologies of implementing electromechanical micromirror devices as spatial light modulators, there are still limitations and difficulties in providing high quality image displays. Specifically, when display images are digitally controlled, image quality is adversely affected due to an insufficient number of gray scales.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM.

FIG. 1A shows a digital video system 1 that includes a display screen 2 disclosed in the relevant U.S. Pat. No. 5,214, 420. A light source 10 is used to generate light energy for the ultimate illumination of display screen 2. Light 9 is further concentrated and directed toward lens 12 by mirror 11. Lens 12, 13, and 14 form a beam columnator to columnate light 9 into a column of light 8. A spatial light modulator 15 is controlled by a computer 19 through data transmitted over data cable 18 to selectively redirect a portion of the light from path 7 toward lens 5 for display on screen 2. FIG. 1B shows that SLM 15 has a surface 16 that includes an array of switchable reflective elements, e.g., micromirror devices 31, such as elements 17, 27, 37, and 47 as reflective elements attached to a hinge 30. When element 17 is in one position, a portion of the light from path 7 is redirected along path 6 to lens 5, where it is enlarged or spread along path 4 to impinge the display screen 2 so as to form an illuminated pixel 3. When element 17 is in another position, light is not redirected toward display screen 2 and, therefore, pixel 3 would be dark.

The on-and-off states of the micromirror control scheme as implemented in U.S. Pat. No. 5,214,420, and by most conventional display systems, impose a limitation on the quality of the display. Specifically, the conventional configuration of the control circuit has the limitations of a gray scale of conventional system (PWM between ON and OFF states) limited by the LSB (least significant bit, or the least pulse width). Due to the ON-OFF states implemented in conventional systems, there is no way to provide a shorter pulse width than the LSB. The minimum brightness, which determines gray scale, is the light reflected during the least pulse width. The limited gray scales lead to a degraded image display.

Specifically, FIG. 1C illustrates an example circuit diagram of a prior art control circuit for a micromirror according to U.S. Pat. No. 5,285,407. The control circuit includes memory cell 32. Various transistors are referred to as "M*" where "*" designates a transistor number, and each transistor is an insulated gate field effect transistor. Transistors M5 and M7 are p-channel transistors; transistors M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states. State 1 is Node A high and Node B low, and state 2 is Node A low and Node B high.

The dual states switching, as illustrated by the control circuit, controls the micromirrors to position either at an ON or an OFF angular orientation, as shown in FIG. 1A. The brightness, i.e., the gray scales of display for a digitally controlled image system, is determined by the length of time the micromirror stays at an ON position. The length of time a micromirror is controlled at an ON position is, in turn, controlled by a multiple bit word. For simplicity of illustration, FIG. 1D shows the "binary time intervals" controlled by a four-bit word. As shown in FIG. 1D, the time durations have relative values of 1, 2, 4, and 8 that, in turn, define the relative brightness for each of the four bits, where 1 is for the least significant bit and 8 is for the most significant bit. According to the control mechanism as shown, the minimum controllable differences between gray scales for showing different brightness is a brightness represented by the "least significant bit" that maintains the micromirror at an ON position.

When adjacent image pixels are shown with a great degree of different gray scales, due to a very coarse scale of controllable gray scale, artifacts are shown between these adjacent image pixels. That leads to a degraded image. The low quality of images is especially pronounced in bright areas of display when there are "bigger gaps" of gray scales between adjacent image pixels. It was observed in an image of a female model that there were artifacts shown on the forehead, the sides of the nose, and the upper arm. The artifacts are generated due to technical limitations produced by a digitally controlled display that does not provide sufficient gray scales. At the bright spots of display, e.g., the forehead, the sides of the nose, and the upper arm, the adjacent pixels are displayed with visible gaps of light intensities.

As the micromirrors are controlled to have a fully ON and fully OFF position, the light intensity is determined by the length of time the micromirror is at the fully ON position. In order to increase the number of gray scales of display, the speed of the micromirror must be increased so that the digital control signals can be increased to a higher number of bits. However, when the speed of the micromirrors is increased, a strong hinge is necessary for the micromirror to sustain the required number of operational cycles for the designated lifetime of operation. In order to drive the micromirrors supported on a further strengthened hinge, a higher voltage is required. The higher voltage may exceed twenty volts and may even be as high as thirty volts. The micromirrors manufactured by applying CMOS technologies probably would not be suitable for operation at this higher range of voltages, and, therefore, DMOS micromirror devices may be required. In order to achieve a higher degree of gray scale control, a more complicate manufacturing process and larger device areas are necessary when a DMOS micromirror is implemented. Conventional modes of micromirror control are therefore faced with a technical challenge since gray scale accuracy must be sacrificed for the benefits of a smaller and more cost effective micromirror display due to the operational voltage limitations.

There are many patents related to light intensity control. These patents include U.S. Pat. Nos. 5,589,852, 6,232,963, 6,592,227, 6,648,476, and 6,819,064. There are further patents and patent applications related to the different shapes of light sources. These patents include U.S. Pat. Nos. 5,442,414, 6,036,318 and Application 20030147052. The U.S. Pat. No. 6,746,123 discloses special polarized light sources for preventing light loss. However, these patents and patent application do not provide an effective solution to overcome the limitations caused by insufficient gray scales in digitally controlled image display systems.

Furthermore, there are many patents related to spatial light modulation, including U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed nor provided direct solutions for a person of ordinary skill in the art to overcome the above-discussed limitations and difficulties.

Therefore, a need still exists in the art of image display systems, which apply digital control of a micromirror array as a spatial light modulator, to provide new and improved systems that overcome the above-discussed difficulties.

Incidentally, in a so-called single-panel display system comprising one SLM, such as a digital micromirror device (DMD), as in the above described system, a color display is performed by converting the light, emitted from a white lamp light source, into a color sequential light by letting the light pass a rotating color wheel, and illuminating and modulation-controlling the SLM using the color sequential light, as disclosed in, for example, U.S. Pat. No. 5,371,543.

Furthermore, such a system, as disclosed in U.S. Pat. No. 5,448,314, for example, uses a color wheel and et cetera, which are shown in FIGS. 3A and 3B, together with the system shown in FIG. 2. The system shown in FIG. 2 is configured such that the RECEIVER 51 receives IMAGE INPUT, which is stored in MEMORY 52 and which is converted into an appropriate format by the PROCESSOR 53. Then the PROCESSOR 53 controls the LIGHT SOURCE 54, COLOR WHEEL 55, and DMD ARRAY 56 so that the light emitted from the LIGHT SOURCE 54 transmits itself in the COLOR WHEEL 55, which is reflected by the DMD ARRAY 56 and is projected onto the SCREEN 57. Specifically, the COLOR WHEEL 55 uses, for example, a color wheel that is segmented into three color filter sections, i.e., red (R), green (G), and blue (B) (these colors are sometimes collectively abbreviated as "RGB" hereafter), as shown in FIG. 3A, and a color wheel segmented into six color filter sections, i.e., RGBRGB, as shown in FIG. 3B.

In such a system, the spot of the light emitted from a light source (also noted as a "source light" hereafter) usually spans the border between the different color filters of the color wheel in rotation, causing the light transmitted through the color wheel to be a mix of colors during the period in which the light spans the border (the period is called a transition period or spoke period), resulting in degrading the color purity of the displayed video image.

For example, when the color wheel which is divided into three sections, i.e., RGB, is rotated, the light transmitted through the color wheel is a mixture of B and R during the period 62 in which the spot 61 of the source light spans the border between the B and R color filters, as shown in FIG. 4. Likewise, in the period spanning other borders, i.e., the border between R and G and between G and B, the light transmitted through the color wheel is a mixture of the colors of the color filters adjacent to each other on each border.

Accordingly, in to prevent degrading color purity due to such color mixtures, U.S. Pat. No. 6,972,777, for example, and the aforementioned U.S. Pat. No. 5,448,314 have proposed a method of blanking the display by means of an SLM (i.e., controlling the SLM under an OFF state) during a transition period.

The method, however, uses no light transmitted through the color wheel during the transition period, increasing periods in which the source light is not used and thus sacrificing the brightness of the display video image.

Specifically, the ratio of a transition period to a video display period of one frame is determined by the diameter of the spot of a source light transmitted through a color wheel and the number of divisions of individual color filters constituting the color wheel. For example, in a common color wheel divided into three sections of colors, i.e., R, G, and B, as shown in FIG. 3A, the ratio of the transition period is about 10%, while for a color wheel (i.e., a six-division color wheel comprising two sets of color filters, i.e., R, G, and B) divided into six sections of colors, i.e., R, G, B, R, G, and B, as shown in FIG. 3B, the ratio of the transition period actually exceeds 20%, resulting in a substantial loss in the volume of light (also noted as "light volume" hereafter).

Furthermore, related to the above described method is U.S. Pat. No. 5,592,188, for example, and others, which have proposed a method for improving the brightness of a display video image by controlling an SLM under an ON state during a transition period.

This method, however, is configured merely to equip the transition period of the video display period of one frame with the period of displaying white light, which degrades the contrast and color purity of the display video image.

As other methods U.S. Pat. Nos. 6,324,006, 6,445,505, et cetera, for example, have proposed a method of displaying a white video image during a transition period, while U.S. Pat. No. 6,567,134, for example, has proposed a method of displaying, during a transition period, the video image of a complementary color that is produced by mixing colors by means of two primary-color filters placed adjacent to each other.

These methods, however, need to generate white-color data and complementary-color data, respectively, to be used for display on the basis of the primary-color video signals, causing the circuit used for processing the video signal to become complex. Meanwhile, the video images of such white and complementary colors used only for the transition period are not capable of providing a sufficient level of gray scale representation or increasing the display period of a primary color, and, therefore, such a scheme does not contribute to improving the level of gray scale representation.

As yet another method, U.S. Pat. No. 6,972,777, and others, have proposed a method of using a color wheel placed between filters of the colors R, G, and B, with the color wheel sandwiching a white-color filter, which converts the transmitting light into white, or sandwiching a transparent filter.

This method, however, allows the light transmitted through the color wheel to be a mix of the primary color and white (W) during a period in which the spot of the source light spans the border between the primary-color filter and the white-color filter, which degrades color purity.

In FIG. 5, for example, the spot 66 of the source light is a mix of B and W during the period 68, which spans the border between the B-color filter and W-color filter 67. Spot 66 is likewise a mix of W and R during the period 69, which spans the border between the W-color filter 67 and R-color filter, which degrades color purity. A similar phenomenon occurs in other periods spanning the borders between the respective primary-color filters and W-color filters. Note that the transmission light is only white during a period in which the spot of the source light transmits itself through only the W-color filter (e.g., the period 70) instead of spanning the border between the primary-color filter and W-color filter.

SUMMARY OF THE INVENTION

In consideration of the situation described above, the present invention aims at providing a technique for preventing color purity from being degraded. This technique is used for an apparatus performing a color display by changing over the color or deflecting direction of an illumination light or projection light.

In order to achieve the aforementioned aim, an apparatus according to an exemplary embodiment of the present invention is a color display apparatus, including a color changeover unit for changing over colors of an illumination light or a projection light, and a control circuit for applying a video signal for generating a control signal for controlling a spatial light modulator, wherein the control circuit generating the control signal corresponding to a first color or a second color during a transition period when the illumination and/or the projection light are projected with a first color coexisting with a second color as the color changeover unit changing over the colors of the illumination light or projection light from the first color to the second color.

An apparatus according to another exemplary embodiment of the present invention is a color display apparatus, including a polarizing direction changeover unit for changing over a polarizing direction of an illumination light or a projection light, a control circuit for applying a video signal for generating a control signal in accordance with the polarizing direction; and a spatial light modulator, wherein the spatial light modulator applying the control signal generated by the control circuit and the polarization direction to operate and modulate the illumination light in a transition modulation state during a transition period when the polarizing direction changeover unit changes over the polarizing directions of the illumination light or projection light from a first polarizing direction to a second polarizing direction.

According to an exemplary embodiment of the present invention this invention further discloses a method to display a color video image from a display apparatus comprising a spatial light modulator comprising a step of applying a control signal corresponding to a first color or a second color to modulate the spatial light modulator during a first transition period when a light of a first color coexists with a second color in changing over from the first color to second color.

According to another exemplary embodiment of the present invention, this invention further discloses a method to display a color video image from display apparatus comprising a spatial light modulator comprising applying a control signal generated in a first transition period when changing from a first color to a second color to control the spatial light modulator when a light of the first color coexists with the light of the second color in changing over from the first color to the second color, and applying a second control signal generated in a second transition period when changing from the second color to a third color to control the spatial light modulator when the light of the second color coexists with the third color in changing over from the second color to the third color.

According to yet another exemplary embodiment of the present invention, this invention discloses a method to display a color video image from a display apparatus comprising a spatial light modulator having a plurality of pixel elements comprising applying a video signal generated during a transition period when changing from a first color to a second color to control the pixel element when the light of the first color coexists with the second color in changing over from the first color to the second color if a brightness of the video signal the pixel element is greater than or equal to a predefined value, and controlling the pixel element to operate in an OFF state during the transition period if the brightness of the video signal for the pixel element is smaller than the predefined value.

An apparatus according to yet another exemplary embodiment of the present invention is a color display apparatus, which includes a color changeover unit for changing over the colors of an illumination light or projection light, and a spatial light modulator for applying a video signal to modulate the illumination light in accordance with a video signal, wherein the spatial light modulator modulating the illumination light of different colors in synchronization with the color changeover unit in changing between light of the different colors.

BRIEF DESCRIPTION OF THE DRAWINGS

The present invention is described in detail below with reference to the following Figures.

DESCRIPTION OF THE PREFERRED EMBODIMENTS

The embodiments of the present invention are described in reference to the drawings hereafter.

A color display apparatus according to a preferred embodiment of the present invention is an apparatus including at least one spatial light modulator (SLM) and performing a color display by means of a color sequential method.

Figure 6:
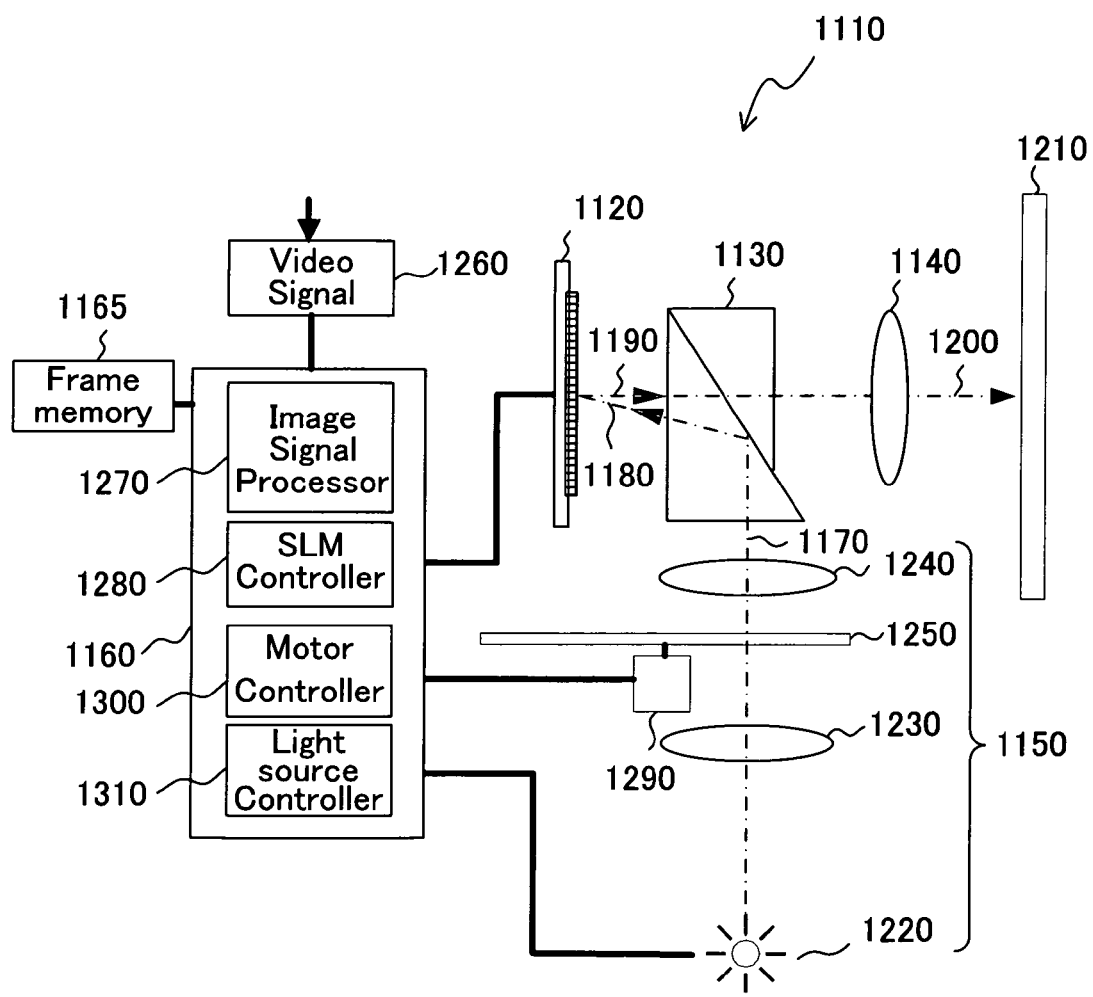
FIG. 6 is a diagram showing an example configuration of a color display apparatus according to a preferred embodiment of the present invention.

FIG. 6 is a diagram showing an example configuration of a color display apparatus according to the present embodiment.

The color display apparatus shown in FIG. 6 is a so-called single-panel display apparatus including one spatial light modulator and is an apparatus performing a color display by means of a color sequential method using a color wheel.

As shown in FIG. 6, the color display apparatus 1110 includes one SLM 1120, a total internal reflection (TIR) prism 1130, a projection optical system 1140, a light source optical system (also called an illumination optical system) 1150, a display processing unit 1160, and frame memory 1165.

Note that the present example configuration assumes that a mirror device including a plurality of micromirrors is adopted as the SLM 1120.

The SLM 1120 and TIR prism 1130 are placed in the optical axis of the projection optical system 1140, and the light source optical system 1150 is placed so that the optical axis thereof is aligned with that of the projection optical system 1140.

The TIR prism 1130 causes an illumination light 1170, which comes from the light source optical system 1150 placed onto the side, to enter the SLM 1120 at a prescribed inclination angle relative thereto as incident light 1180 and to cause a reflection light 1190 reflected by the SLM 1120 to transmit itself so as to reach the projection optical system 1140.

The projection optical system 1140 projects the reflection light 1190, as projection light 1200, incoming by way of the SLM 1120 and TIR prism 1130 to a screen 1210.

The light source optical system 1150 includes 1) a white light source 1220 for generating the illumination light 1170, 2) condenser lenses 1230 and 1240 for converging the illumination light 1170, and, between the condenser lenses 1230 and 1240, 3) a color wheel 1250 used for changing over the colors of the illumination light 1170.

The white light source 1220, condenser lens 1230, color wheel 1250, and condenser lens 1240 are placed in the aforementioned order on the optical axis of the illumination light 1170 (i.e., the illumination light path) emitted from the present white light source 1220 and incident to the side face of the TIR prism 1130.

Figure 1A:
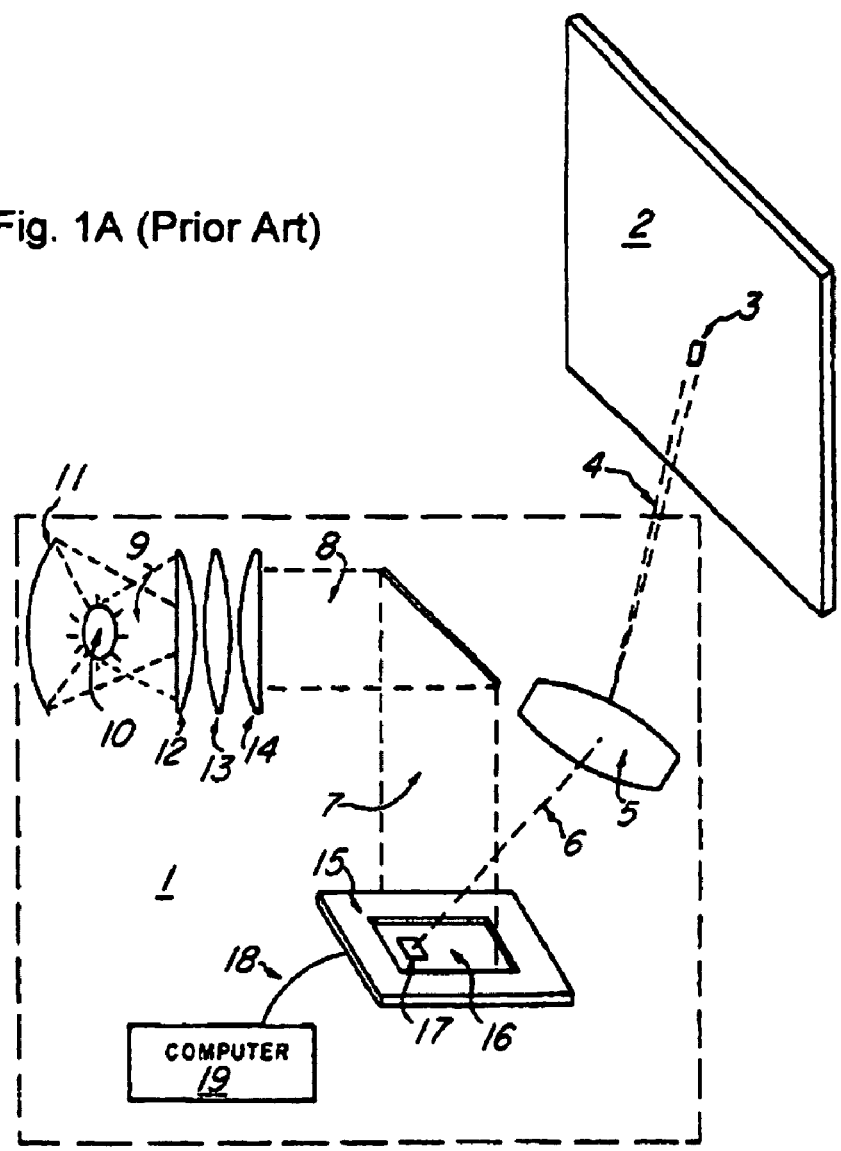
FIG. 1A is a functional diagram showing the configuration of a projection apparatus according to a conventional technique.
Figure 1B:
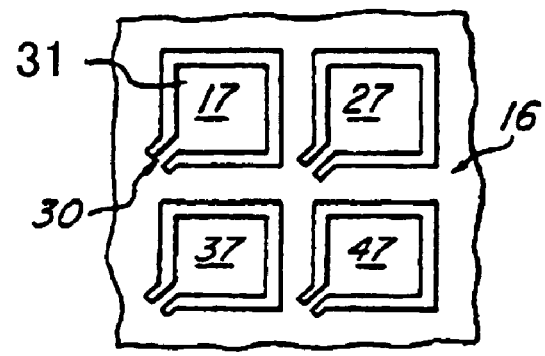
FIG. 1B is a functional diagram showing the configuration of a mirror element of a projection apparatus according to a conventional technique.
Figure 1C:
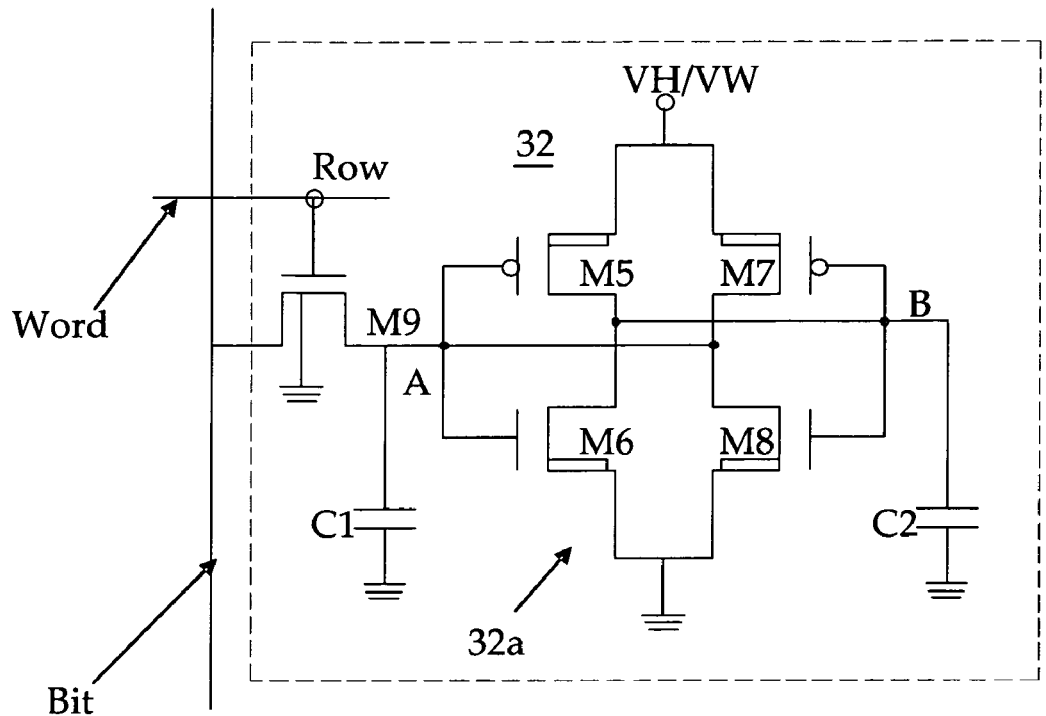
FIG. 1C is a functional diagram showing the configuration of the drive circuit of a mirror element of a projection apparatus according to a conventional technique.
Figure 1D:
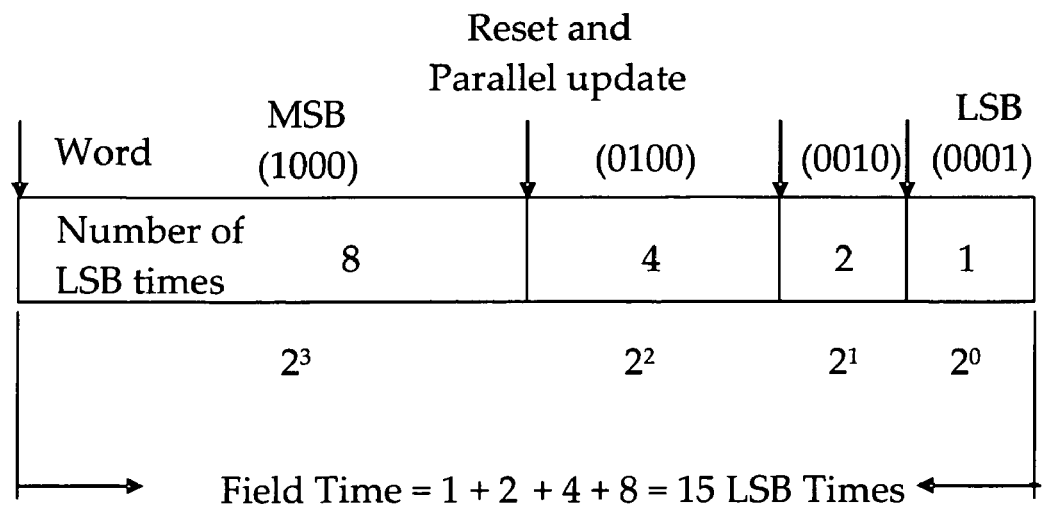
FIG. 1D is a functional diagram showing the format of image data used in a projection apparatus according to a conventional technique.
Figure 2:
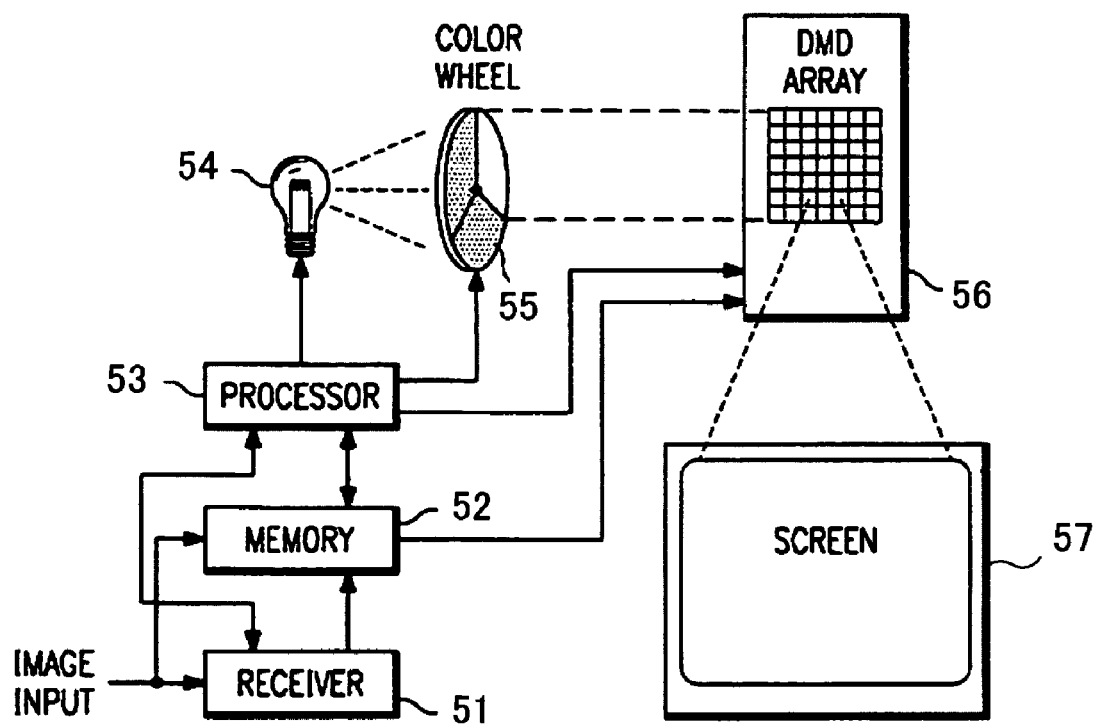
FIG. 2 is a diagram illustrating a color display system according to a conventional technique.
Figure 3A:
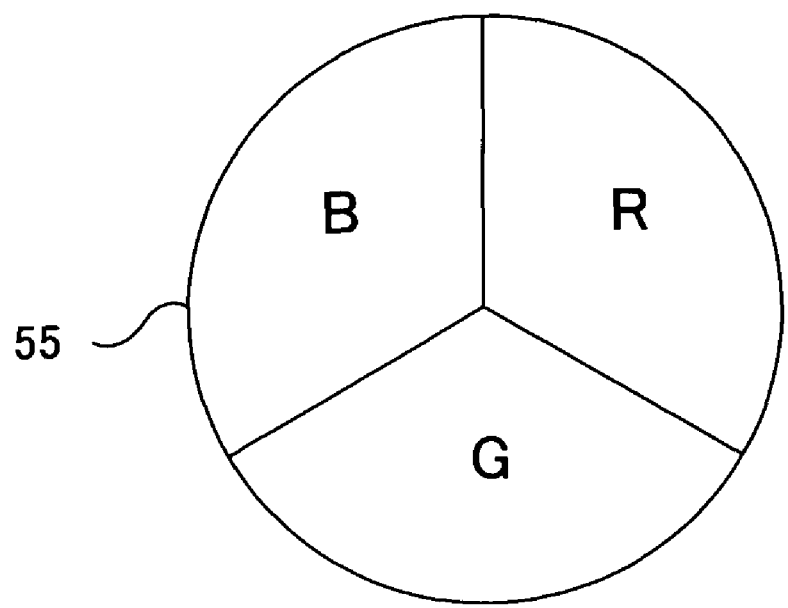
FIG. 3A is a diagram showing a color wheel divided into three sections of color filters R, G, and B.
Figure 3B:
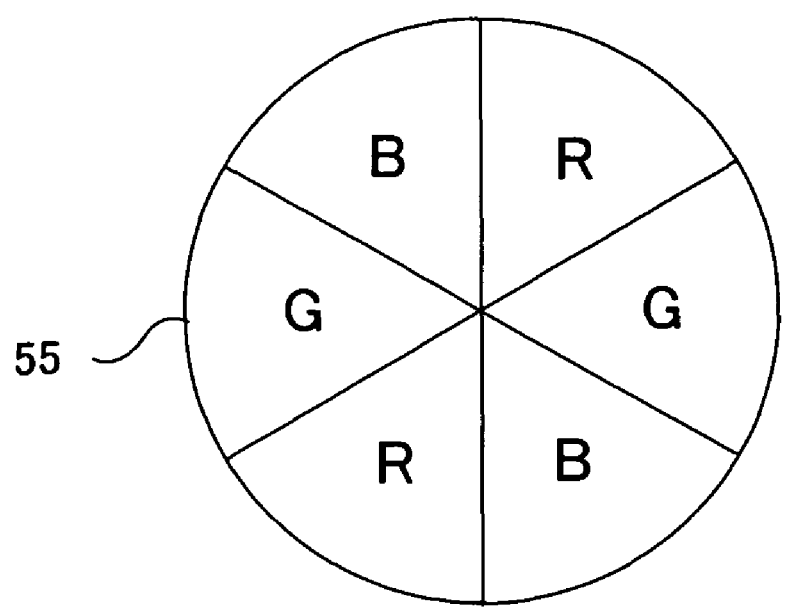
FIG. 3B is a diagram showing a color wheel divided into six sections of color filters R, G, B, R, G, and B.
Figure 4:
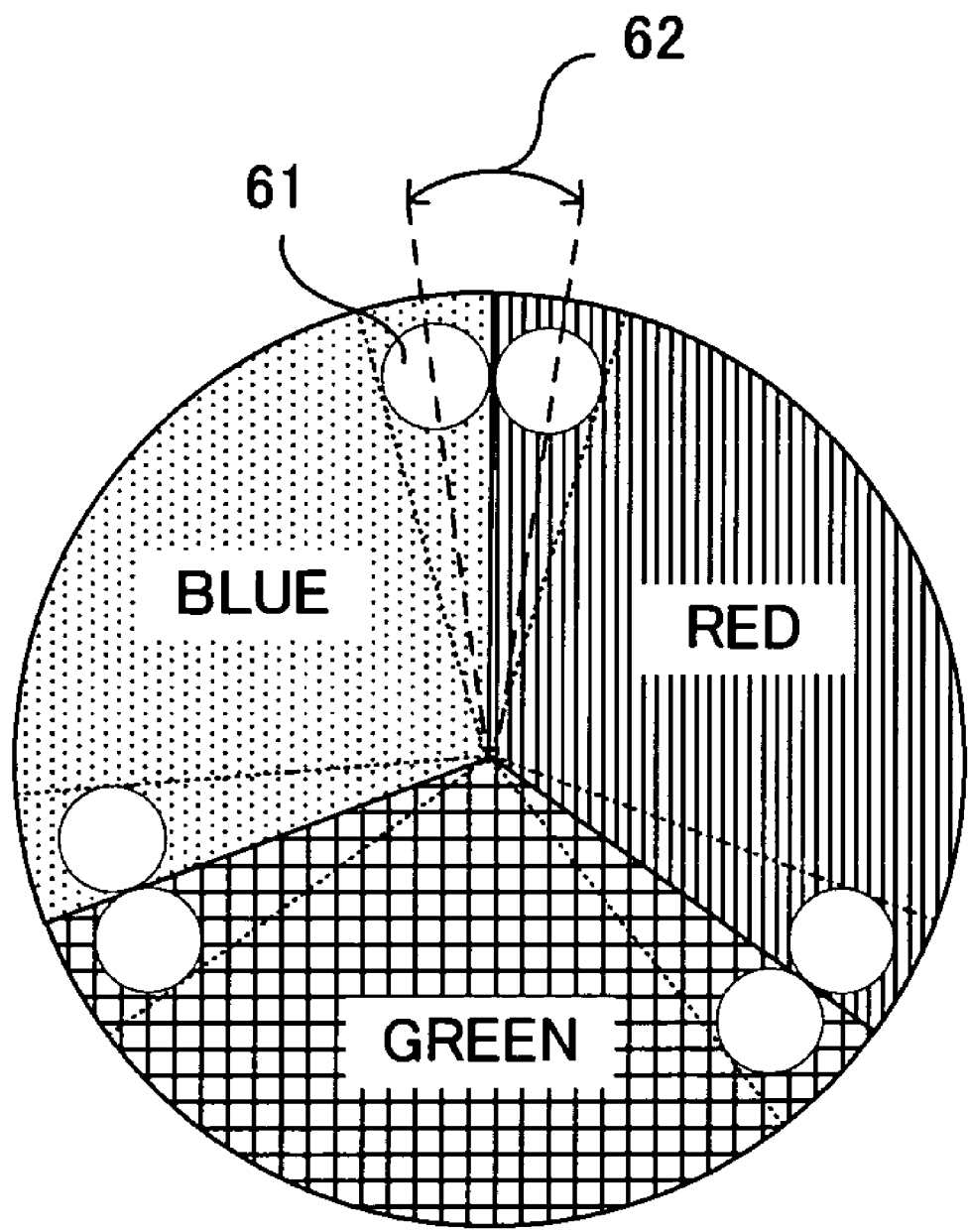
FIG. 4 is a diagram showing an example of the color purity of a display video image being degraded during a transition period when a color wheel divided into three sections of color filters R, G, and B is used.
Figure 5:
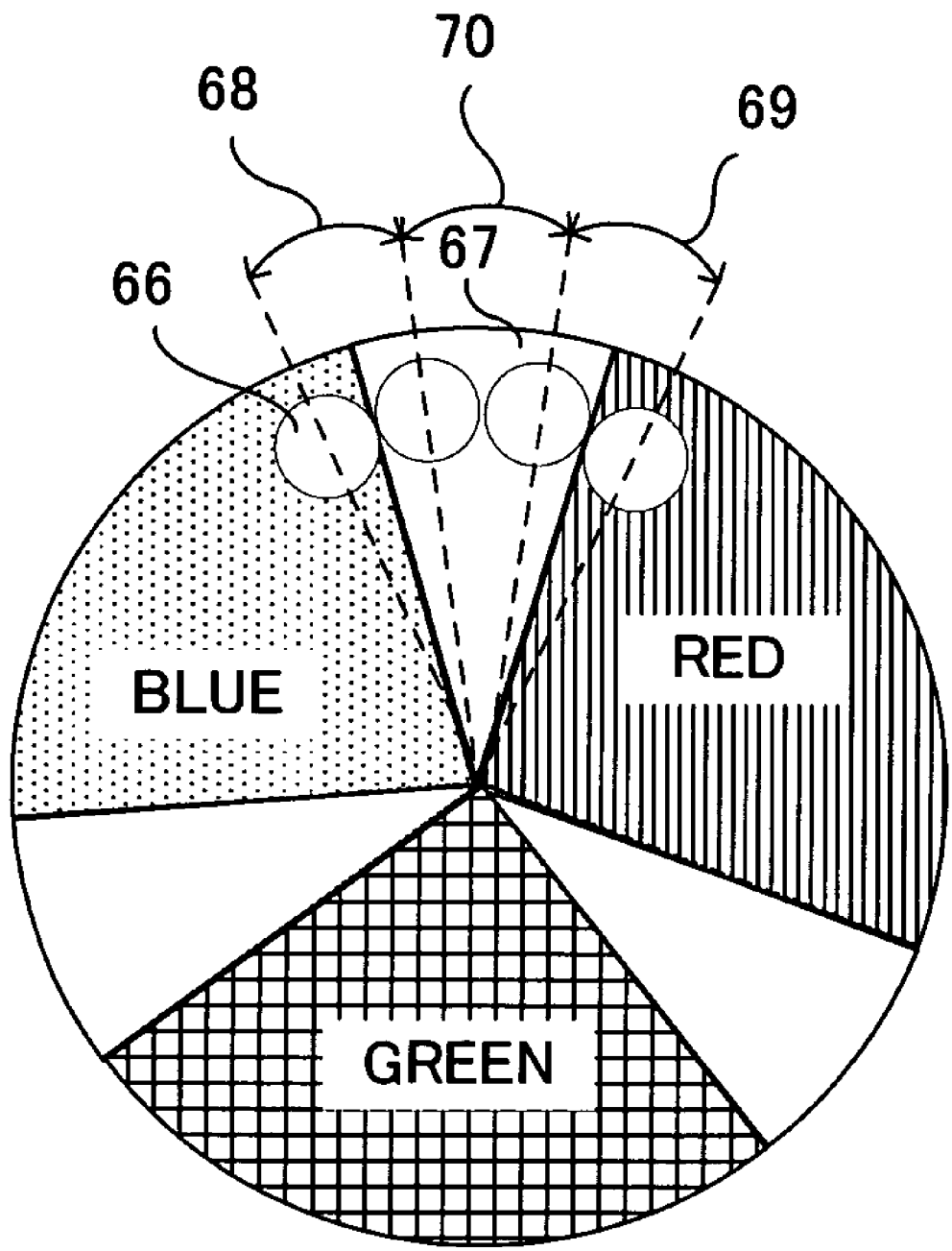
FIG. 5 is a diagram showing an example of the color purity of a display video image being degraded during a transition period when a color wheel produced by sandwiching a white-color filter between each of color filters R, G, and B, is used.

Note that the color wheel 1250 is a color wheel produced by placing a plurality of color filters transmitting lights of different wavelengths (i.e., different colors) and is configured to insert in sequence an individual color filter into the illumination light path when the color wheel is rotated by a motor 1290. The color wheel 1250 may use, for example, a color wheel including the color filters of respective colors, R, G, and B, as shown in FIG. 3A (and FIG. 4) and FIG. 3B. In this case, the colors of the illumination light 1170 is sequentially changed over among the colors R, G, and B with the rotation of the color wheel 1250. The present example configuration assumes that the color wheel shown in FIG. 3A (and FIG. 4) is adopted as the color wheel 1250.

The display processing unit 1160 includes an image signal processor 1270, an SLM controller 1280, a motor controller 1300, and a light source controller 1310.

The image signal processor 1270 receives a continuously inputted video signal 1260 and generates, from the video signal 1260 in the amount of one frame, a sub-frame video signal (which is a digital signal) of each color of R, G, and B in accordance with the color of the illumination light changed over by the color wheel 1250. Furthermore, if the inputted video signal 1260 is an analog signal, the image signal processor 1270 is enabled to carry out an analog/digital (A/D) conversion process for converting the inputted analog signal into a digital signal and a process for converting the resolution. Note that the frame memory 1165 is connected to the image signal processor 1270 so that the frame memory 1165 retains, for example, data in the amount of one frame of the data represented by the input video signal 1260.

The SLM controller 1280 is a control circuit for 1) generating control data, which is a control signal, from the sub-frame signal generated by the image signal processor 1270 for each sub-frame video image of each color of R, G, and B, and 2) controlling the SLM 1120 on the basis of the generated control data.

The motor controller 1300 controls 1) the motor 1290 in accordance with the SLM controller 1280 controlling the SLM 1120 and 2) the rotation of the color wheel 1250. The light source controller 1310 controls the white light source 1220.

The configuration of display processing unit 1160 controls the rotation of the color wheel 1250 so as to insert in sequence the color filters of corresponding colors into the illumination light path synchronously with the sub-frame video image of each color of R, G, and B, which are to be projected in sequence onto the screen 1210 in accordance with the inputted video signal 1260. The video display apparatus thereby applies a color sequential method to display video images.

Figure 7:
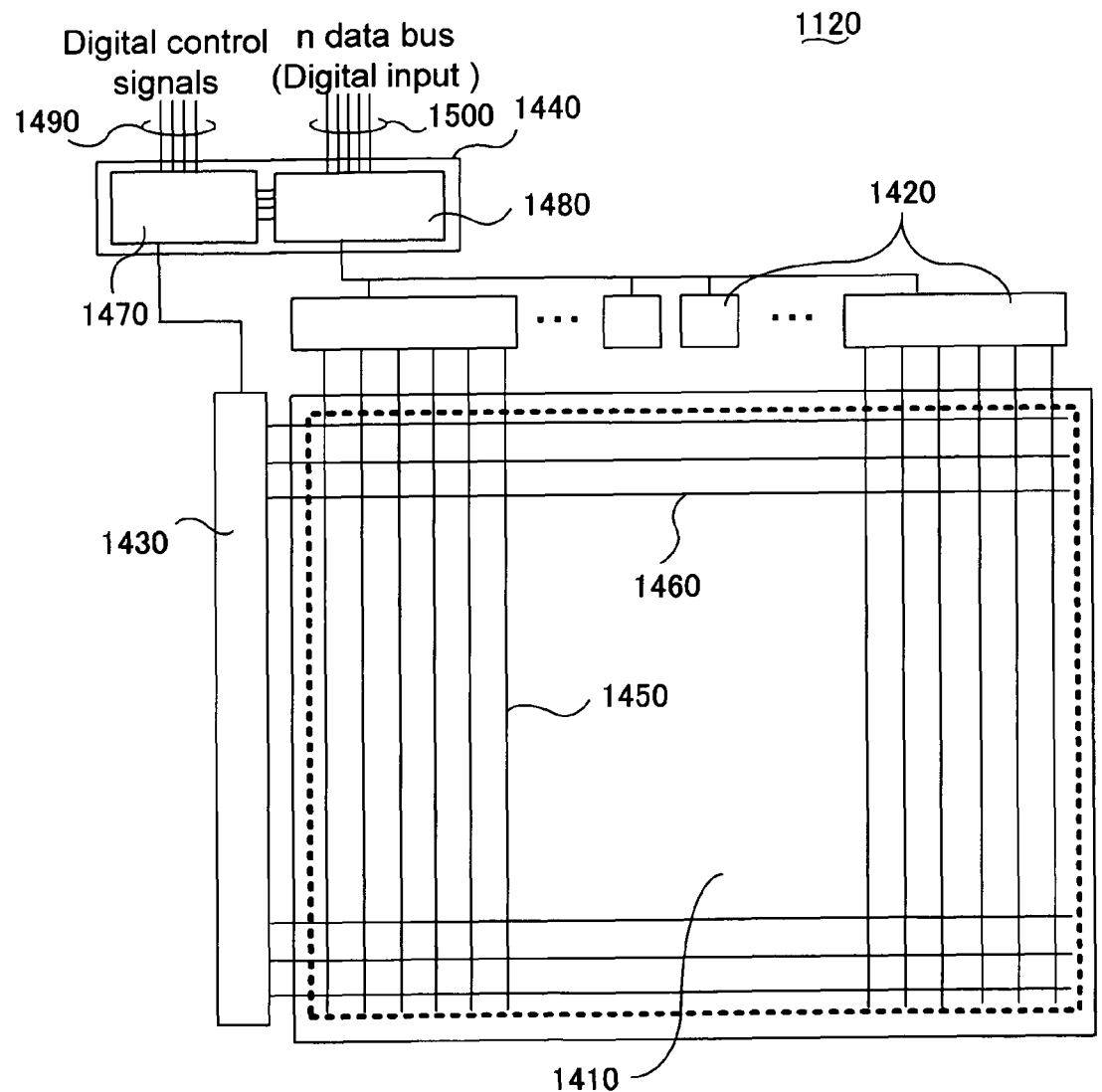
FIG. 7 is a diagram showing an example configuration of an SLM.

FIG. 7 is a diagram showing an example configuration of the SLM 1120.

The SLM 1120 configured as illustrated in FIG. 7 includes a mirror element array (i.e., a pixel element array) 1410, a column driver 1420, a row driver 1430, and an external interface unit 1440.

In the mirror element array 1410, plural micromirror elements (i.e., pixel elements) are arranged in a grid-like fashion (noted as "arrayed" hereinafter) at each position where a bit line 1450 vertically extended from the column driver 1420 and a word line 1460 horizontally extended from the row diver 1430 cross each other. Note that the following description defines the micromirror element simply as "mirror element".

The external interface unit 1440 includes a timing controller 1470 and a parallel/serial interface 1480. The timing controller 1470 selects the mirror elements horizontally lined up with a word line 1460 on the basis of a scan timing control signal 1490 inputted from the SLM controller 1280. The parallel/serial interface 1480 supplies the column driver 1420 with a modulation control signal 1500.

Figure 8A:
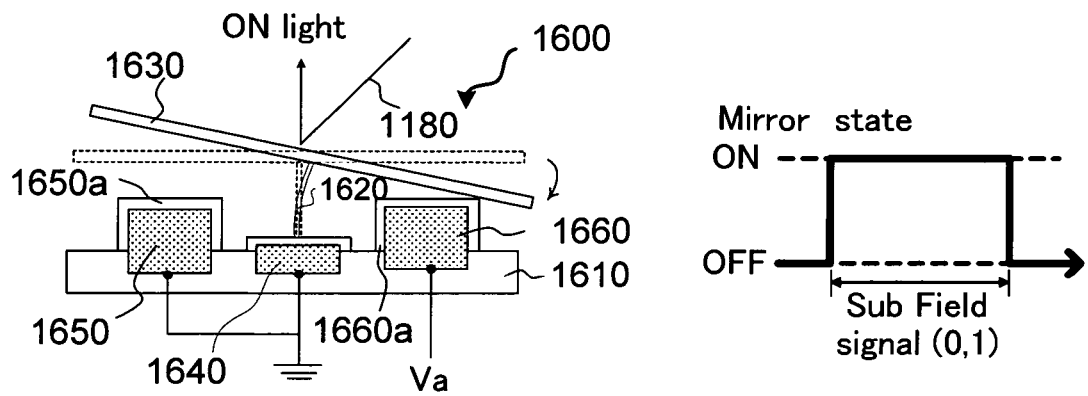
FIG. 8A is a diagram showing an example configuration of a mirror element of an SLM, with the ON state of a micromirror depicted.
Figure 8B:
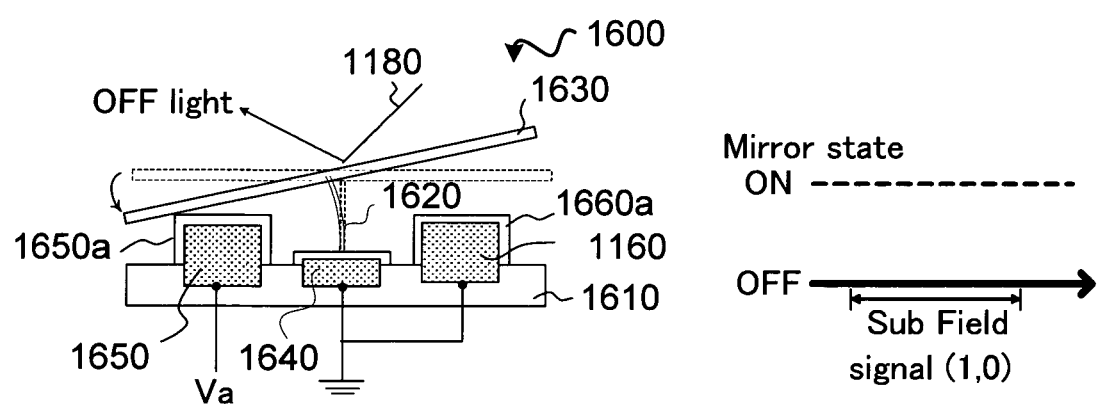
FIG. 8B is a diagram showing an example configuration of each mirror element of an SLM, with the OFF state of a micromirror depicted.
Figure 8C:
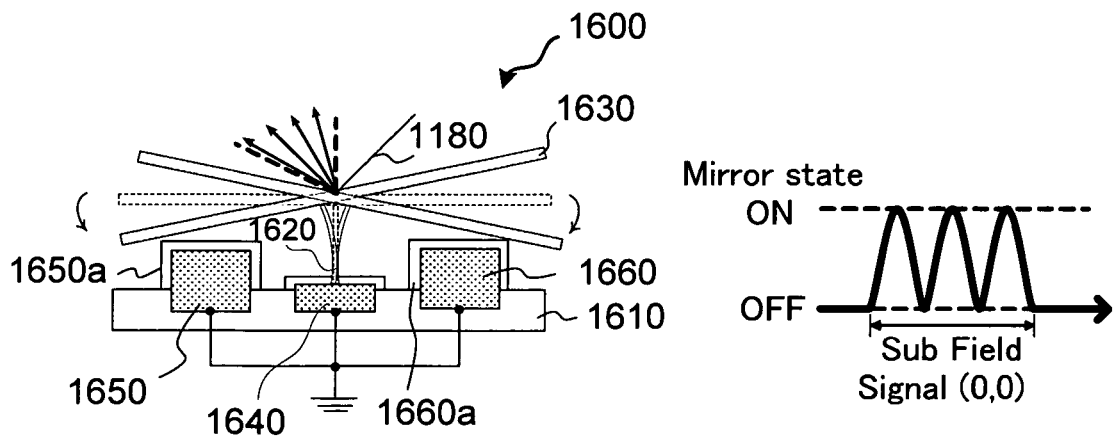
FIG. 8C is a diagram showing an example configuration of each mirror element of an SLM, with the oscillation state of a micromirror depicted.

FIGS. 8A, 8B, and 8C each shows an example configuration of each mirror element of the SLM 1120, with FIG. 8A depicting the ON state of a micromirror, FIG. 8B depicting the OFF state of the micromirror, and FIG. 8C depicting the oscillation state of the micromirror.

As shown in FIGS. 8A, 8B, and 8C, each mirror element 1600 includes a micromirror 1630 supported on a substrate 1610 by way of a hinge 1620 so as to be freely deflectable.

On the substrate 1610, an OFF electrode 1650 (and an OFF stopper 1650a) and an ON electrode 1660 (and an ON stopper 1660a) are placed in symmetrical positions with a hinge 1620 including a hinge electrode 1640 sandwiched between the aforementioned electrodes (and stoppers).

As shown in FIG. 8A, when a predetermined voltage Va is applied to the ON electrode 1660, it attracts the micromirror 1630 with a coulomb force to tilt it to a position abutting on the ON stopper 1660a. With this operation, the incident light 1180 incident to the micromirror 1630 is reflected to the light path of an ON position that matches the optical axis of the projection optical system 1140. Note that the chart on the right side of FIG. 8A indicates the state of the micromirror 1630 when a ground (GND) electric potential (noted as "potential" hereinafter) and a potential Va corresponding to a signal (0, 1) are applied to the OFF electrode 1650 and ON electrode 1660, respectively.

As shown in FIG. 8B, when a predetermined voltage Va is applied to the OFF electrode 1650, it attracts the micromirror 1630 with a coulomb force to tilt it to a position abutting on the OFF stopper 1650a. With this operation, the incident light 1180 incident to the micromirror 1630 is reflected to the light path of an OFF position that is shifted from the optical axis of the projection optical system 1140. Note that the chart on the right side of FIG. 8B indicates the state of the micromirror 1630 when the potential Va and GND potential corresponding to a signal (1, 0) are applied to the OFF electrode 1650 and ON electrode 1660, respectively.

When the potentials of the ON electrode 1660 and OFF electrode 1650 are turned to "0" (i.e., the GND potential) in a state in which the micromirror 1630 is as shown in FIG. 8A or 8B, the micromirror 1630 starts a free oscillation by means of the elasticity of the hinge 1620 as shown in FIG. 8C. With this operation, the incident light 1180 incident to the micromirror 1630 is reflected to light paths between the light path of the above described ON position and that of the above described OFF position, more specifically, the light path in accordance with the tilting state of the micromirror 1630. Note that the chart on the right side of FIG. 8C indicates the state of the micromirror 1630 when the GND potential and GND potential corresponding to a signal (0, 0) are applied to the OFF electrode 1650 and ON electrode 1660, respectively.

Figure 9:
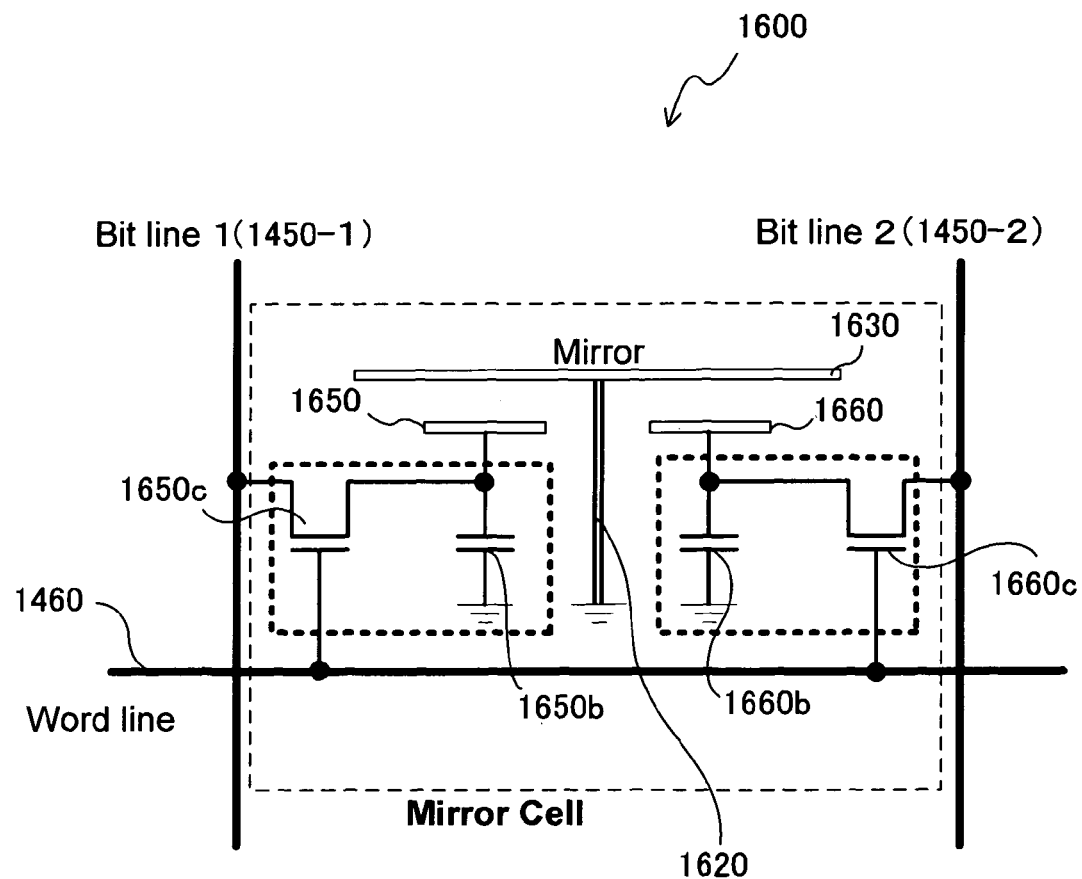
FIG. 9 is a diagram showing an example configuration of a circuit for each mirror element of an SLM.

FIG. 9 is a diagram showing an example configuration of a circuit for each mirror element 1600 of the SLM 1120.

As shown in FIG. 9, each mirror element 1600 is configured such that an OFF capacitor 1650b is connected to the OFF electrode 1650, and the OFF capacitor 1650b is connected to a bit line 1450-1 by way of a gate transistor 1650c.

Furthermore, an ON capacitor 1660b is connected to the ON electrode 1660, and the ON capacitor 1660b is connected to a bit line 1450-2 by way of a gate transistor 1660c.

The opening and closing of the gate transistor 1650c and gate transistor 1660c are controlled through a word line 1460.

More specifically, one horizontal row of the mirror elements 1600 lined up with a discretionary word line 1460 are simultaneously selected, and the charging and discharging of electric charge to and from the OFF capacitor 1650b and ON capacitor 1660b are controlled through the bit lines 1450-1 and 1450-2, and thus the ON/OFF/oscillation of the micromirror 1630 of each mirror element 1600 within the aforementioned one horizontal row is individually controlled.

Figure 10:
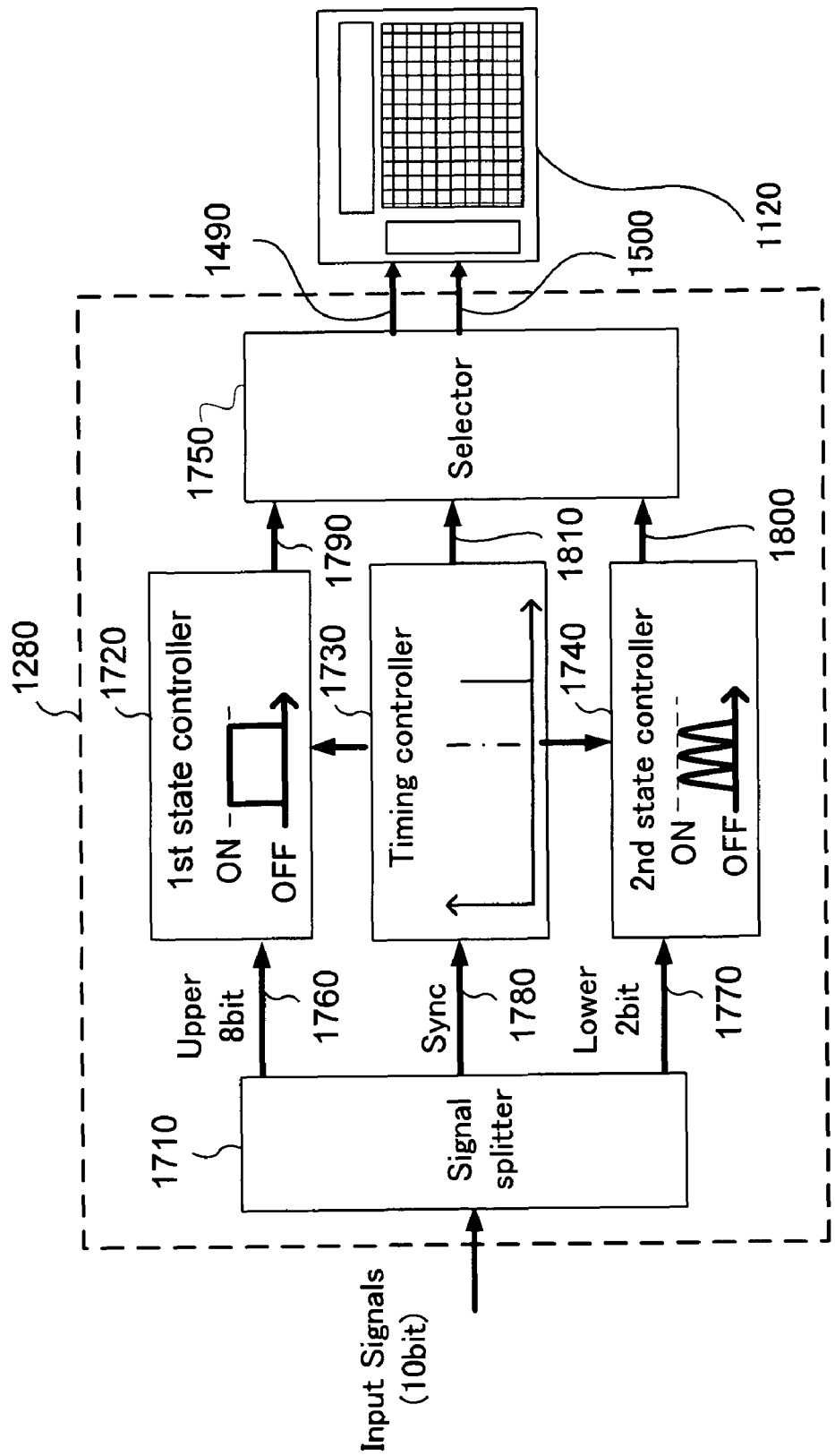
FIG. 10 is a diagram showing the primary comprisal of an SLM controller.

FIG. 10 is a diagram showing the primary comprisal of the SLM controller 1280.

As shown in FIG. 10, the SLM controller 1280 includes a signal splitter 1710, a first state controller 1720, a timing controller 1730, a second state controller 1740, and a selector 1750.

The signal splitter 1710 includes two functions, 1) the function of dividing the sub-frame video signal of each color of R, G, and B, and the signal input from the image signal processor 1270 into division data 1760 used for controlling the micromirror 1630 under the ON/OFF state and division data 1770 used for controlling the micromirror 1630 under the oscillation state, and 2) the function of outputting a synchronous signal 1780 used for controlling the operation of the timing controller 1730. For example, if the sub-frame video signal of each color is 10-bit binary data, the aforementioned function divides the data into the upper 8 bits and lower 2 bits as the division data 1760 and division data 1770, respectively.

The first state controller 1720 includes the functions of generating non-binary data 1790 (which is described later) from the division data 1760 that is binary data and outputting the generated data to the SLM 1120 by way of the selector 1750, thereby controlling the micromirror 1630 under the ON/OFF state.

The second state controller 1740 includes the functions of generating non-binary data 1800 (which is described later) from the division data 1770 that is binary data and outputting the generated data to the SLM 1120 by way of the selector 1750, thereby controlling the micromirror 1630 under the oscillation state.

The timing controller 1730 includes the functions of 1) calculating the period of time for controlling the micromirror 1630 under the ON state and the period of time for controlling the micromirror 1630 under the oscillation state, with both of the periods being within one sub-frame, for each micromirror 1630 corresponding to the pixel of an image, on the basis of a synchronous signal 1780, 2) controlling the first state controller 1720 and second state controller 1740, and 3) outputting a changeover control signal 1810 to the selector 1750.

The selector 1750 changes over between the non-binary data 1790 and non-binary data 1800, determining which of them is to be output to the SLM 1120 on the basis of the changeover control signal 1810, thereby changing the control for the micromirror 1630 from an ON/OFF modulation control performed by the first state controller 1720 (using the non-binary data 1790) to an oscillation modulation control performed by the second state controller 1740 (using the non-binary data 1800). Alternately, the oscillation modulation control may also be change to the ON/OFF modulation control.

Figure 11:
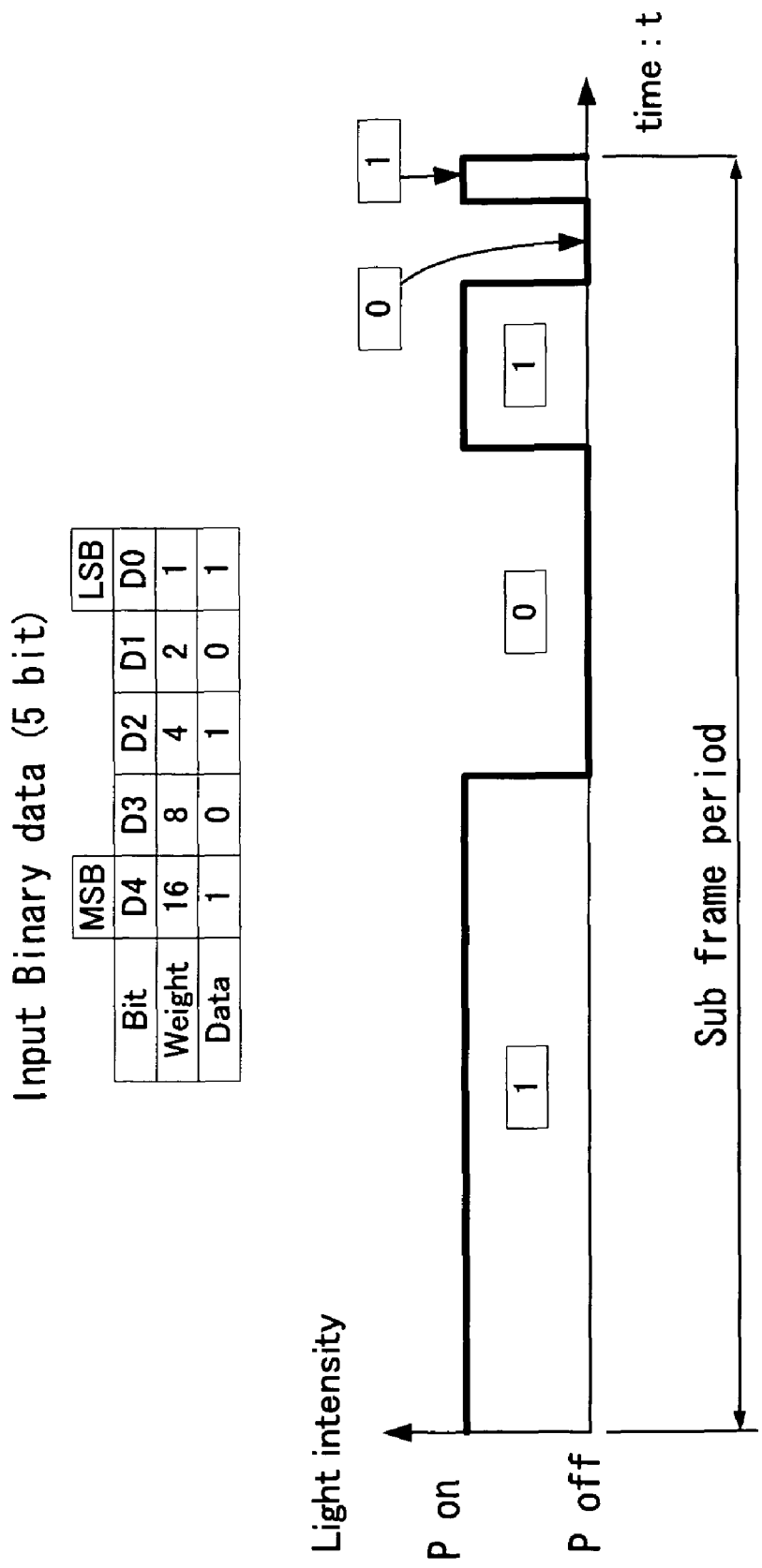
FIG. 11 is a diagram describing binary data.
Figure 12:
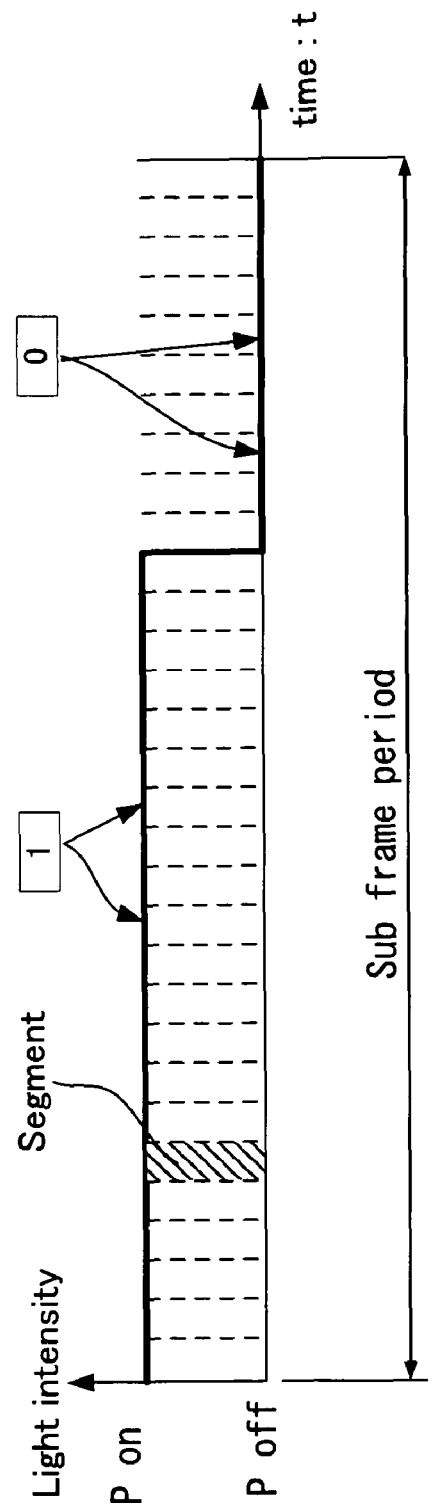
FIG. 12 is a first diagram describing non-binary data.
Figure 13:
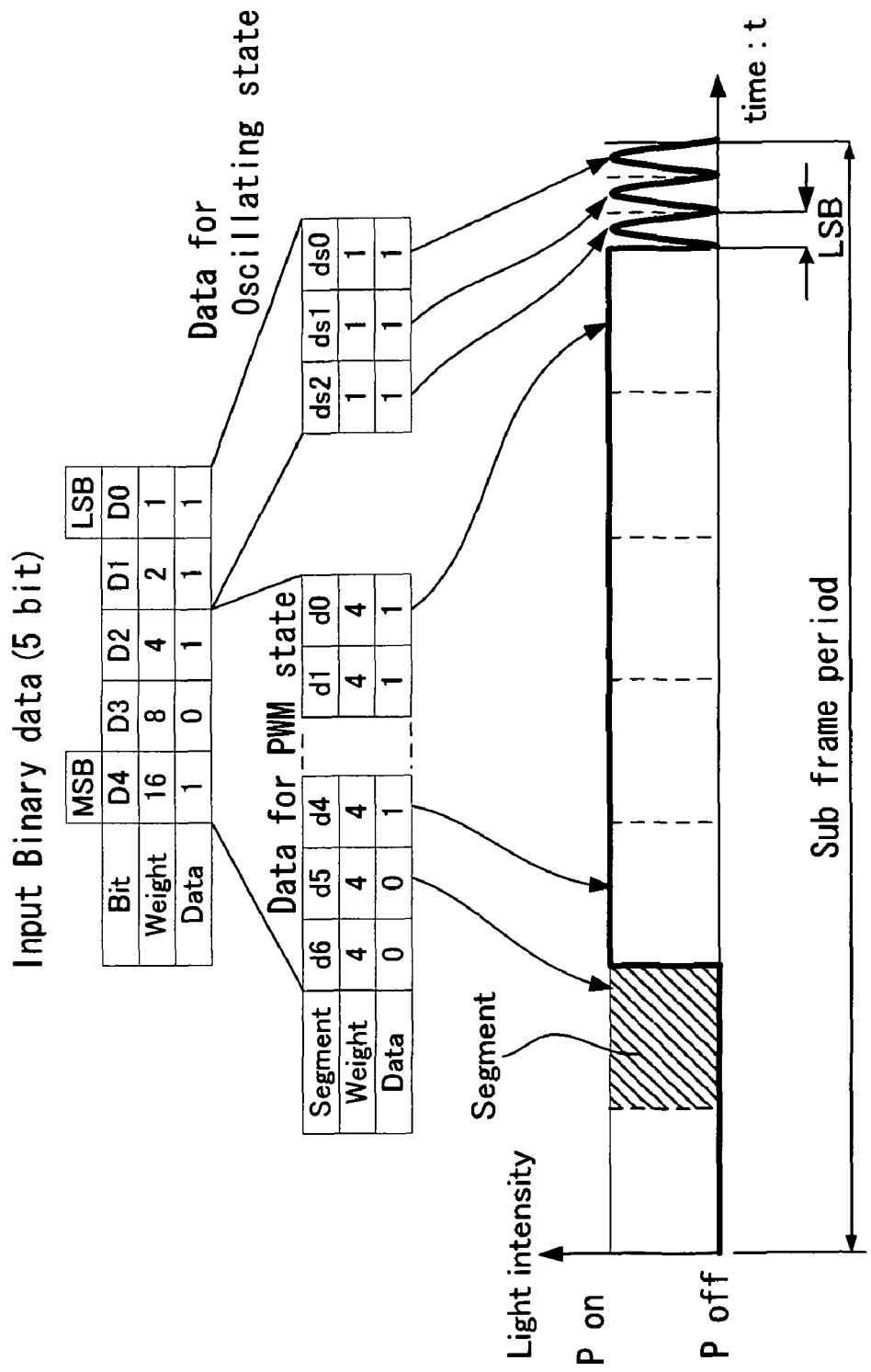
FIG. 13 is a second diagram describing non-binary data.

Refer to FIGS. 11, 12, and 13 for illustrations of binary data and non-binary data. Note that the color display apparatus according to the present embodiment is configured to control the micromirror 1630 on the basis of non-binary data for controlling modulations under the ON/OFF and oscillation states as described above. Specifically, a further description is provided by illustrating the case (referring to FIG. 11) of controlling the micromirror 1630 with binary data, and the case (referring to FIG. 12) of controlling the micromirror 1630 with non-binary data used for performing only the ON/OFF modulation control. Note that the examples shown in FIGS. 11 through 13 show example operations of displaying one sub-frame video image for one color in one pixel of a projection image, with the assumption that each sub-frame video signal of each color of the inputted colors R, G, and B is 5-bit binary data, for convenience of description.

The binary data inputted to the SLM controller 1280 is data having different weights ranging from the LSB to MSB, as seen in the binary data shown in FIGS. 11 through 13.

As illustrated in FIG. 11, when controlling the micromirror 1630 using the inputted binary data (i.e., Input Binary data) as is, the weight of each bit of the binary data corresponds to a time width for performing a pulse width modulation (PWM) control, more specifically, each bit corresponds to the period of each segment, and the value of each bit (i.e., 1 or 0) of the binary data indicates the state of a corresponding segment (i.e., the ON state or OFF state).

In contrast, as illustrated in FIG. 12, when generating non-binary data from the inputted binary data (i.e., the Input Binary data), and controlling the micromirror 1630 using the generated non-binary data so as to perform only the ON/OFF modulation control, the period of a segment is determined by the weight of the LSB (i.e., the weight=1) of the binary data, and the binary data is converted into data (i.e., a bit string) for each non-binary segment. More specifically, the number of ON states in LSB intervals of the binary data is calculated, and non-binary data, with which the micromirror 1630 is controlled so that the period of ON state continues for the duration of the bit string, is generated. In this case, the number of periods of a continuous ON state (i.e., the number of continuous segments of which the value of segment is "1") is equal to the value obtained by converting the binary data into a decimal number, and, therefore, the generated non-binary data can be defined as decimal data.

Furthermore, as illustrated in FIG. 13, when generating non-binary data from the inputted binary data (i.e., Input Binary data) and controlling the micromirror 1630 using the generated non-binary data so as to perform the ON/OFF- and oscillation modulation controls, non-binary data is generated as follows. More specifically, the present embodiment is configured to generate both non-binary data 1790, which is generated from the upper 3 bits of the input binary data and which causes the micromirror 1630 to perform the ON/OFF modulation control, and non-binary data 1800, which is generated from the remaining lower 2 bits of the input binary data and which causes the micromirror 1630 to perform the oscillation modulation control. Specifically, for the non-binary data 1790 causing the micromirror 1630 to perform the ON/OFF modulation control, the period of a segment is determined by the weight that is four times the LSB (i.e., the weight=4) of the binary data, and the upper 3 bits of the input binary data is converted into data (i.e., a bit string) for each binary segment. Furthermore, for the non-binary data 1800 causing the micromirror 1630 to perform the oscillation modulation control, the period of a segment is determined by the weight of the LSB (i.e., the weight=1) of the binary data, and the remaining lower 2 bits of the binary data is converted into data (i.e., a bit string) for each non-binary segment.

Incidentally, in the examples shown in the above described FIGS. 12 and 13, the weight of a segment for the generated non-binary data may adopt another weight, in lieu of being limited to the weight shown in the figures. However, the weights of individual segments of the binary data that causes the micromirror 1630 to perform the ON/OFF modulation control are the same, and also the weights of individual segments of the binary data that causes the micromirror 1630 to perform the oscillation control are the same. Furthermore, an alternate configuration may be such that an intermediate gray scale level may be generated by controlling the micromirror 1630 between the ON and OFF states in lieu of being limited to the oscillation modulation control.

The following is a description of the operation of the color display apparatus according to the present embodiment.

The color display apparatus according to the present embodiment is configured to control the modulation of the micromirror 1630 of the SLM 1120 on the basis of the control data (i.e., the non-binary data generated by the SLM controller 1280) of a first color and/or second color during the transition period in which the light of the first color and that of the second color coexist in the illumination light 1170, when the color wheel 1250 changes over the colors of the illumination light from the first color to second color.

Figure 14:
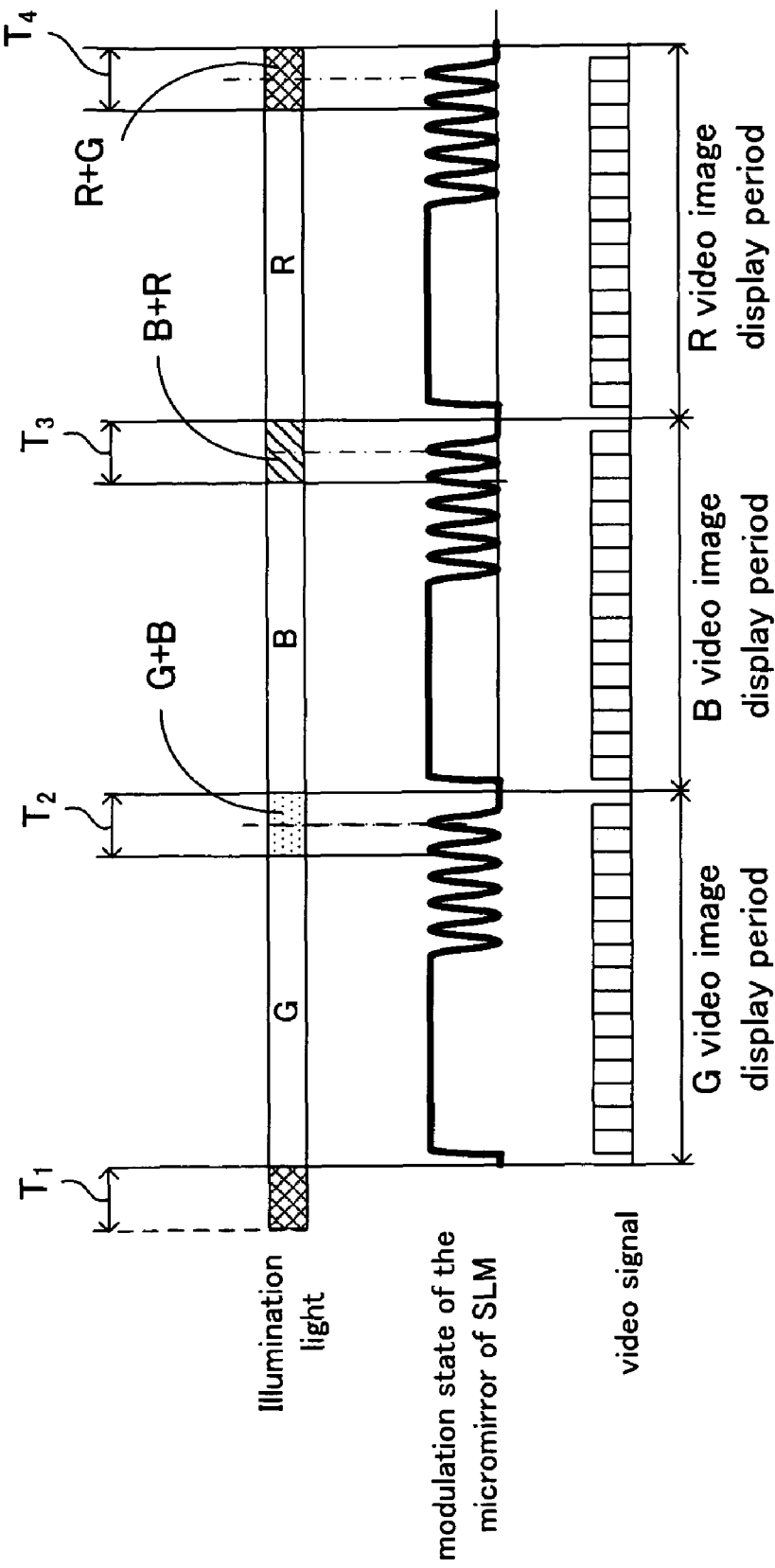
FIG. 14 is a diagram showing an example of modulation control for a micromirror.

FIG. 14 is a diagram showing an example case of such a control, illustrating the case of performing a modulation control for the micromirror 1630 of an SLM 1120 using the control data of the first color during the period of the above described transition.

Note that FIG. 14 shows only an example control for one pixel of a projection image for convenience of description (which is the same for FIGS. 15 through 18). Furthermore, FIG. 14 shows only an example control in the case in which the respective sub-frame video images of green (G), blue (B), and red (R) are sequentially displayed in accordance with changing over the colors of the illumination light 1170 by means of the color wheel 1250 (which is the same for FIG. 15).

In FIG. 14, each of the periods $T_1$, $T_2$, $T_3$, and $T_4$ is the above described transition period. For example, the transition period $T_2$ is the period in which the light of color G and that of color B coexist in an illumination light 1170, when the color wheel 1250 changes over the colors of the illumination light 1170 from G to B. Transition period $T_3$ is the period in which the light of color B and that of color R coexist in an illumination light 1170, when the color wheel 1250 changes over the colors of the illumination light 1170 from B to R.

As shown in FIG. 14, the control is an example of a configuration for controlling the modulation of the micromirror 1630 using the control data of a first color during such a transition period. For example, in transition period $T_2$, the modulation of the micromirror 1630 is controlled on the basis of the control data of G, which is the first color.

When a modulation control is performed in the transition period, however, the modulation control for the micromirror 1630 using the control data of the first color is carried out on the basis of the non-binary data 1800, which is used for performing an oscillation modulation control. Therefore, the modulation of the micromirror 1630 is carried out by the oscillation control in the transition period. For example, in transition period $T_2$, the modulation of the micromirror 1630 is controlled under the oscillation using the non-binary data 1800 of the control data of color G, which is the first color in this event.

The present control controls the micromirror 1630 under the oscillation state in the transition period. Thereby, the ratio of mixed colors in the sub-frame video image of each color can be reduced for decreasing the degree to which color purity is compromised.

Figure 15:
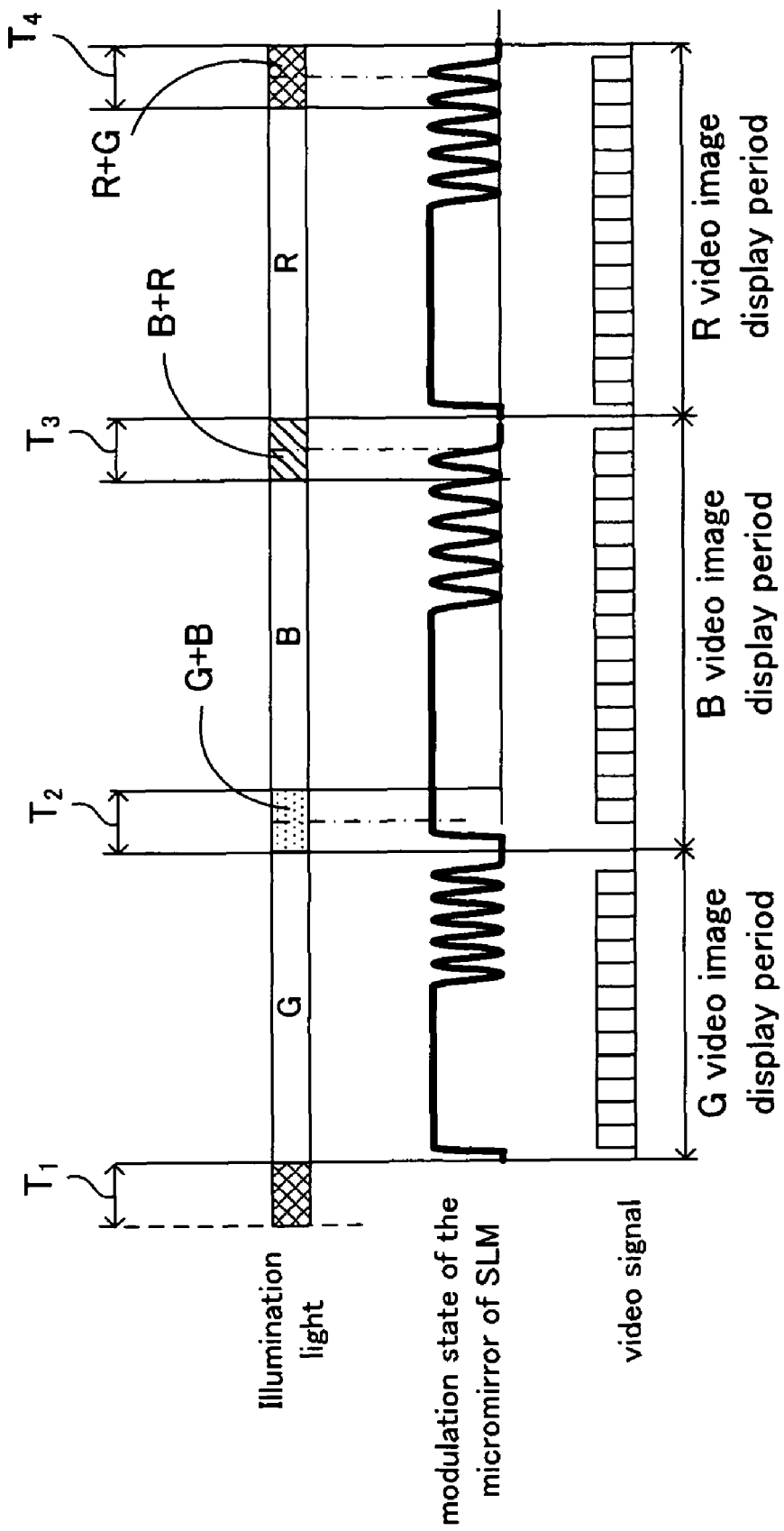
FIG. 15 is a diagram showing an example modification of the modulation control shown in FIG. 14.

FIG. 15 is an example modification of the example control shown in FIG. 14.

The example control shown in FIG. 15 is different from the example control shown in FIG. 14 specifically, only in the transition period (e.g., $T_2$ shown in FIG. 15) in which the colors of the illumination light 1170 is changed from G to B, the modulation of the micromirror 1630 is controlled on the basis of the control data of color B, which is the second color.

The present control controls the modulation of the micromirror 1630 on the basis of the control data of the color B in the transition periods (e.g., $T_2$ and $T_3$ shown in FIG. 15) in which the illumination light 1170 contains the light of color B, with which the visibility is low. This thereby prevents mixture with another color in the display period of the color C, and, as a result, enhances the color purity of G and produces a fine display video image.

Alternatively, if a mixture of colors is not a concern, a similar control may be applied to the color G in place of B. More specifically, the modulation of the micromirror 1630 may be controlled on the basis of the control data of the second color (i.e., G in this case) during the transition period (e.g., $T_1$ shown in FIG. 15) in which the colors of the illumination light 1170 is changed from the color R to G, in place of during a transition period (e.g., $T_2$ shown in FIG. 15) in which the colors of the illumination light 1170 is changed over from the color G to B. In this case, the modulation control periods on the basis of the control data of the respective colors are longer with C, B, and R, in this order. Therefore, the number of gray scale levels of G can be increased to enhance the image with a high visibility.

Figure 16:
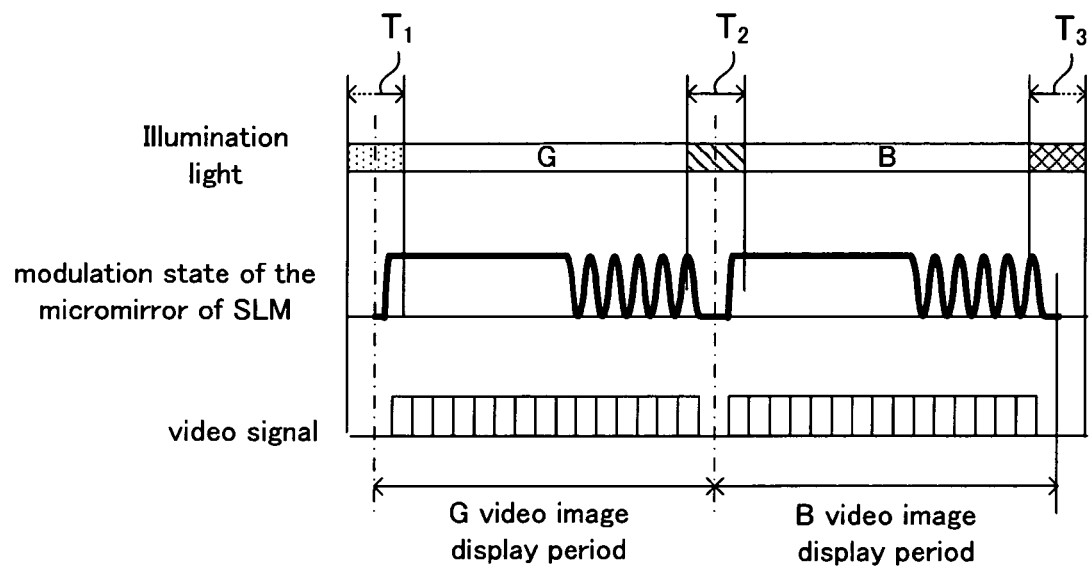
FIG. 16 is a diagram showing another example of modulation control for a micromirror.

FIG. 16 is a diagram showing another example control.

Figure 18:
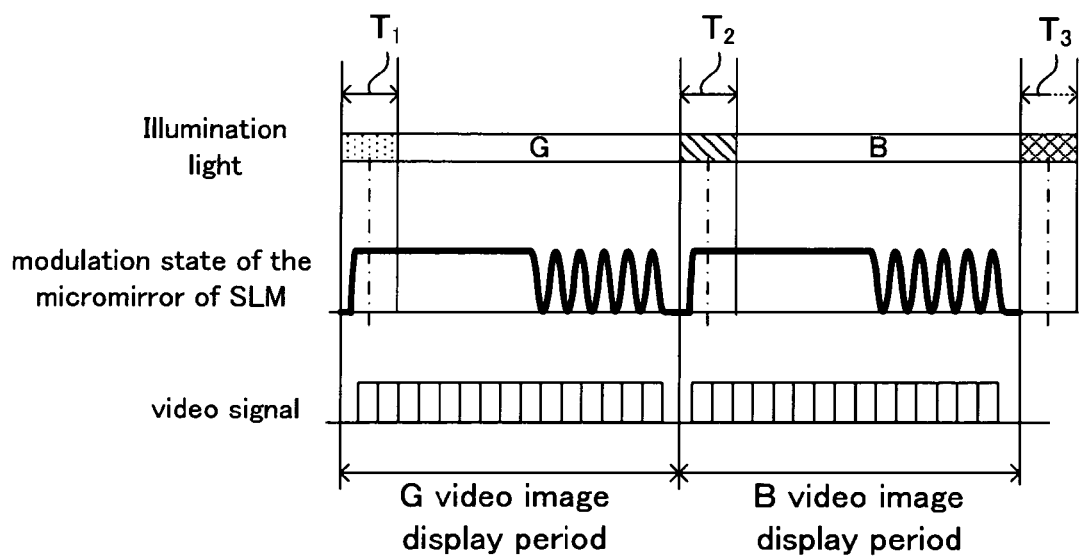
FIG. 18 is a diagram showing yet another example of modulation control for a micromirror.

Note that FIG. 16 shows only an example control carried out when the respective sub-frame video images of colors G and B are displayed in sequence in accordance with the color wheel 1250 changing over the colors of the illumination light 1170 for convenience of description (which is also the same for FIG. 18). Also in FIG. 16, the transition periods $T_1$, $T_2$, and $T_3$ are the same as those described with reference to FIGS. 14 and 15 (which is also the same for FIG. 18).

As shown in FIG. 16, the control is an example of controlling the modulation of the micromirror 1630 of an SLM 1120 on the basis of the control data of a first color and that of a second color, during a transition period in which the light of the first color and that of the second color coexist in an illumination light 1170, when the color wheel 1250 changes over the colors of the illumination light 1170 from the first color to second color. For example, in transition period $T_2$, the modulation of the micromirror 1630 is controlled on the basis of the control data of the color G, which is the first color, and the control data of the color B, which is the second color.

When the modulation control is carried out in the transition period, however, the modulation of the micromirror 1630 on the basis of the control data of the first color is carried out using the non-binary data 1800, which is used for performing an oscillation modulation control, and the modulation of the micromirror 1630 on the basis of the control data of the second color is carried out using the non-binary data 1790, which is used for performing an ON/OFF modulation control. Therefore, the modulation of the micromirror 1630 is controlled by means of oscillation and ON/OFF-states in the transition period. For example, in the transition period $T_2$, the modulation of the micromirror 1630 is controlled by means of oscillation and ON/OFF-states on the basis of the non-binary data 1800 of the control data of the color G, which is the first color in this event, and the non-binary data 1790 of the control data of the color B, which is the second color in this event, respectively.

Note that the sub-frame video images of the colors G and B, which are shown in FIG. 16, both have the brightness at no less than a predefined level, and therefore the period of the micromirror 1630 being controlled under the ON modulation is included in the period of the micromirror 1630 being controlled under the ON/OFF modulation during the transition period. However, if the brightness of a sub-frame video image is less than the predefined level, the modulation of the micromirror 1630 is controlled under the OFF state in the period of the modulation of the micromirror 1630 being controlled under ON/OFF-states during the transition period.

Figure 17:
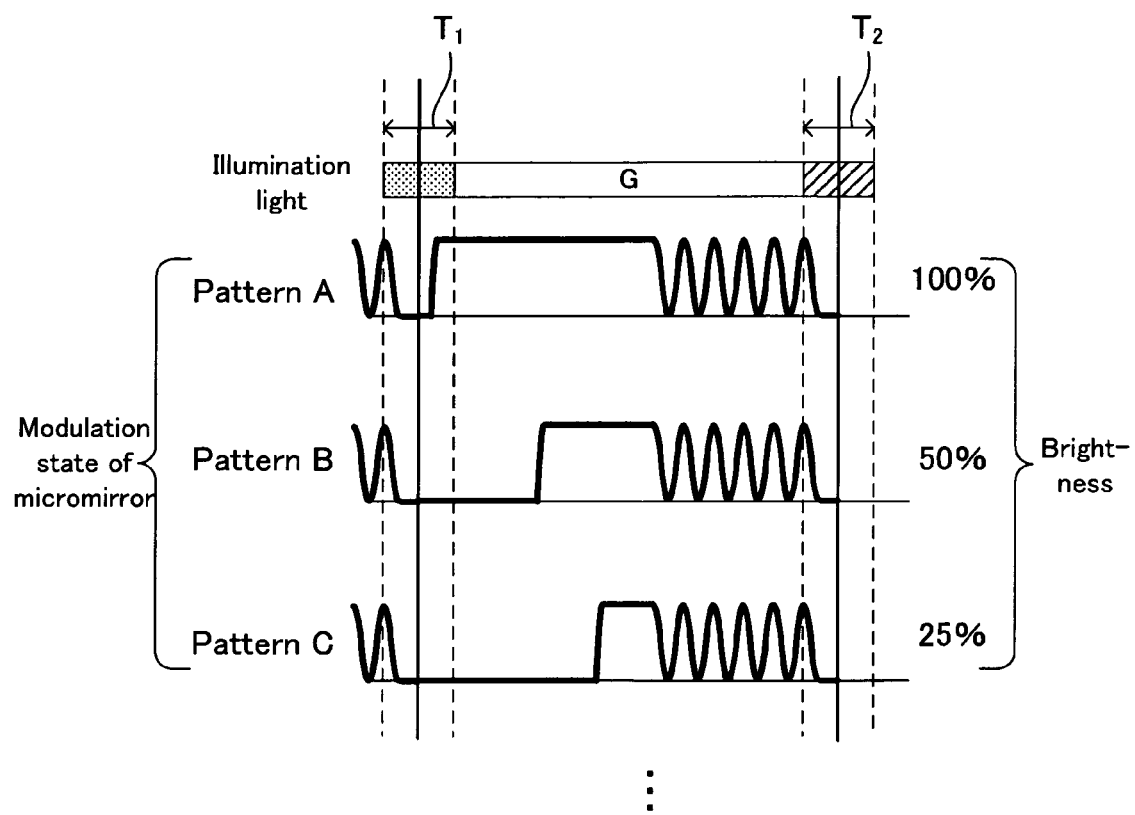
FIG. 17 is a diagram showing an example control pattern in accordance with the brightness of a sub-frame video image.

FIG. 17 is a diagram showing an example control pattern in accordance with the brightness of such a sub-frame video image.

Note that FIG. 17 shows only an example control used when the sub-frame video image of the color G is displayed. Furthermore, the transition periods $T_1$ and $T_2$ are the same as those shown in FIG. 16.

As shown in FIG. 17, if the brightness of a sub-frame video image is no lower than a predefined level, such as the brightness being 100% (refer to the pattern A of FIG. 17), the control is the same as shown in FIG. 16. In contrast, if the brightness of a sub-frame video image is less than the predefined level, such as the brightness being 50%, 20% (i.e., the patterns B and C of FIG. 17) or the like, the ON modulation control for the micromirror 1630 is not included in the transition period (e.g., transition period $T_1$).

With the control as described with reference to FIGS. 16 and 17, although a period in which the micromirror 1630 is controlled under the ON modulation is included within the transition period for a pixel having a high level of brightness among the pixels within a projection image, the ratio of the light volume within the period to the light volume per one sub-frame video image is actually small, and therefore the influence of reduced color purity can be substantially eliminated and the brightness of a pixel can also be enhanced. On the other hand, for a pixel having a low level of brightness, a period in which the micromirror 1630 is controlled under the ON modulation is actually not included in the transition period, and it is thereby reducing the degree in compromising the color purity.

FIG. 18 is a diagram showing yet another example control.

The control shown in FIG. 18 is an example of controlling the modulation of the micromirror 1630 of an SLM 1120 on the basis of the control data of a second color, during a transition period in which the light of a first color and that of the second color coexist in an illumination light 1170, when the color wheel 1250 changes over the colors of the illumination light 1170 from the first color to second color. For example, in transition period $T_2$, in which the colors of the illumination light 1170 are changed from the colors G to B, the modulation of the micromirror 1630 is controlled on the basis of the control data of the color B, which is the second color.

When the modulation is controlled during the transition period, however, the modulation of the micromirror 1630, based on the control data of the second color, is controlled using the non-binary data 1790 used for performing the ON/OFF modulation control. Therefore, the modulation of the micromirror 1630 is controlled by ON/OFF-states during the transition period. For example, in the transition period $T_2$, the modulation of the micromirror 1630 is controlled using the non-binary data 1790 of the control data of the color B.

Note that the respective sub-frame video image of the colors G and B shown in FIG. 18 both have a brightness that is no less than the predefined level, and therefore the period of the micromirror 1630 being controlled under the ON modulation is included in the period in which the modulation of the micromirror 1630 is controlled under the ON/OFF-states within the transition period. However, if the brightness of a sub-frame video image is less than the predefined level, the modulation of the micromirror 1630 is controlled under the OFF-state during the period in which the modulation of the micromirror 1630 is controlled by ON/OFF-states, within the transition period, as in the case of the control described with reference to FIGS. 16 and 17.

Such a control makes can therefore obtain a benefit similar to that of the control described with reference to FIGS. 16 and 17.

Specifically, the color display apparatus according to the present embodiment is configured to implement the color wheel 1250 on the side close to the illumination light path. The quality of image display is improved because the color wheel 1250 is now placed on the side near the projection light path.

Furthermore, the color display apparatus according to the present embodiment is also configured to apply the non-binary data 1800 when the modulation of the micromirror 1630 is controlled under oscillation during the transition period. As described in FIG. 10, the non-binary bits received by the SLM controller 1280 are generated from the lower bit data of a sub-frame video signal (i.e., Input Binary data).

Furthermore, the color display apparatus according to the present embodiment is also configured to control the state of the modulation light per a unit of time (i.e., an LSB time) of each mirror element 1600 to operate in any of three states, i.e., the state of the maximum light volume (i.e., the ON state), that of the minimum light volume (i.e., the OFF state), and the state of an intermediate light volume (i.e., the oscillation state), as described above.

Alternatively, the color display apparatus according to the present embodiment may also be configured to control each mirror element 1600 under a modulation state of generating an intermediate light volume during the transition period. The modulation state of generating an intermediate light volume may be an intermediate state in which the micromirror 1630 is stationary between the ON state and OFF state, or is in the initial horizontal state, in lieu of being limited to the oscillation state.

Alternatively, the color display apparatus according to the present embodiment may also be configured as follows. More specifically, during the first transition period when the light of a first color coexists with a second color in an illumination light 1170, when the color wheel 1250 changes over the colors of the illumination light 1170 from the first color to second color, the modulation of the micromirror 1630 of an SLM 1120 is controlled on the basis of the first control data (i.e., non-binary data generated by the SLM controller 1280) of the first or second color; and, further, during the second transition period in which the light of the second color and that of the third color coexist in the illumination light 1170, when the color wheel 1250 changes over the colors of the illumination light 1170 from the second color to third color, the modulation of the micromirror 1630 of the SLM 1120 is controlled on the basis of the second control data (i.e., non-binary data generated by the SLM controller 1280) of a color that is different from the color of the first control data. As an example, the control shown in the above described FIG. 14 can also be obtained by such a control.

Alternatively, the color display apparatus according to the present embodiment may also be configured as follows. More specifically, at least in a part of the period of the first transition period, in which the light of a first color and that of a second color coexist in an illumination light 1170, when the color wheel 1250 changes over the colors of the illumination light 1170 from the first color to second color, the modulation of the micromirror 1630 of an SLM 1120 is controlled on the basis of the control data (i.e., non-binary data generated by the SLM controller 1280) of the second color; and, further, at least in a part of the period of the second transition period, in which the light of the second color and that of the third color coexist in the illumination light 1170, when the color wheel 1250 changes over the colors of the illumination light 1170 from the second color to third color, the modulation of the micromirror 1630 of the SLM 1120 is controlled on the basis of the control data (i.e., non-binary data generated by the SLM controller 1280) of the second color. For example, the control shown in the above described FIG. 15 can also be obtained by such configured control.

Alternatively, the color display apparatus according to the present embodiment may also be configured as follows. More specifically, if the value of brightness of the video signal corresponding to a pixel is no lower than a predefined value, the modulation of a mirror element 1600 corresponding to the pixel is controlled on the basis of the control data (i.e., non-binary data generated by the SLM controller 1280) corresponding to a first color or second color, during a transition period in which the light of the first color and that of the second color coexist in an illumination light 1170, when the color wheel changes over the colors of the illumination light 1170 from the first color to second color. If the value of brightness of the video signal corresponding to the pixel is lower than the predefined value, the modulation of the mirror element 1600 corresponding to the pixel is controlled under the OFF-state during the transition period. For example, the control described with reference to the above described FIGS. 16 and 17 can also be obtained by such configured control.

Alternatively, the color display apparatus according to the present embodiment may also be configured as follows. More specifically, the timing at which the color wheel 1250 changes over the colors of an illumination light 1170, and the timing at which the mirror element of an SLM modulates the illumination light 1170 of a color changed over by the color wheel 1250, are differentiated depending on the color that is changed over by the color wheel 1250.

Figure 19:
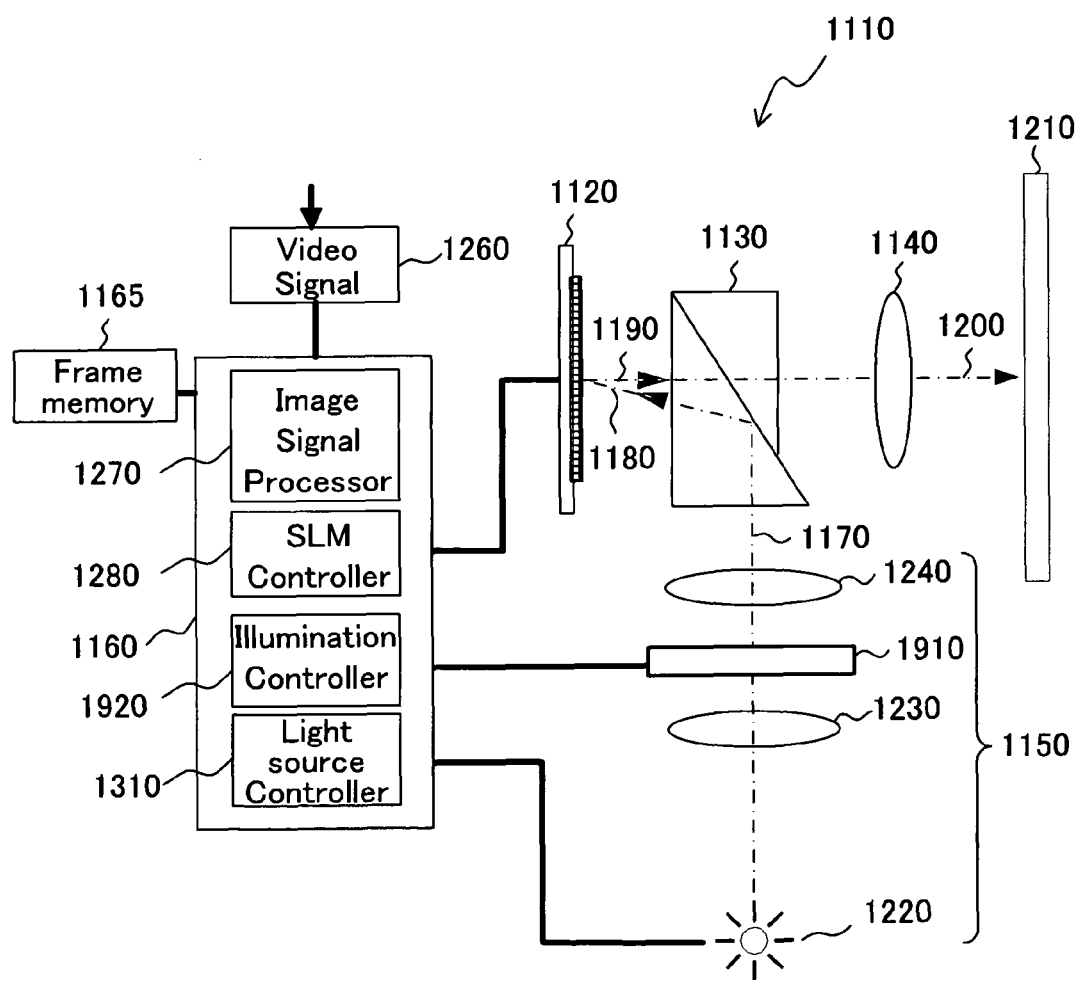
FIG. 19 is a diagram showing an example of applying a wavelength selection switch element in place of a color wheel.
Figure 20:
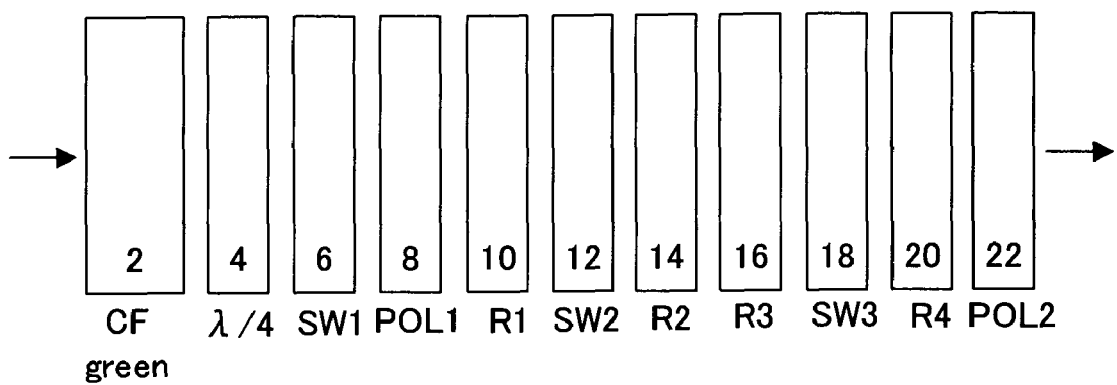
FIG. 20 is a diagram showing an example wavelength selection switch element.

Meanwhile, the color display apparatus according to the present embodiment is configured to use the color wheel 1250 as the means for changing over the colors of an illumination light 1170. A wavelength selection switch element 1910 may also be implemented in place of using the color wheel 1250 as shown in FIG. 19. The wavelength selection switch element 1910 is an element used for selectively changing over the light of a wavelength to be transmitted, making it possible to generate a color sequential illumination light 1170, as the color wheel 1250 is also capable of. Such a configuration eliminates the need to use the motor 1290 for rotating the color wheel 1250. Accordingly, the display processing unit 1160 is implemented with an illumination controller 1920 for controlling the wavelength selection switch element 1910, in place of applying the motor controller 1300 for controlling the rotation of the motor 1290. In this case, the illumination controller 1920 controls the wavelength selection switch element 1910 in accordance with the SLM controller 1280 controlling the SLM 1120, thereby generating a color sequential illumination light 1170. More Specifically, the wavelength selection switch element 1910 may adopt the color switch shown in FIG. 20, the color switch proposed in US Patent Application US2003/0058387. In a wavelength selective switch element using a liquid crystal, such as the aforementioned color switch, a mixture of colors is generated in the illumination light during the period in which the colors of the illumination light is changed over (more specifically, the period when the liquid crystal is in response). The relationship of the response speed of the liquid crystal results in a mixture, and, therefore, the above described modulation control according to the present embodiment is effectively performed.

Furthermore, the color display apparatus according to the present embodiment is configured to use the color wheel 1250 as the means for changing over the colors of an illumination light 1170. It is also possible to use, in place of the color wheel 1250, a rotation wheel in which a plurality of wavelength selection polarization elements is arranged. Note that the plurality of wavelength selection polarization elements is a plurality of polarization elements with which the wavelengths of light to act are different. It is possible to generate a color sequential illumination light 1170 as a result of the rotation wheel rotating, as in the case of the color wheel 1250.

Figure 21:
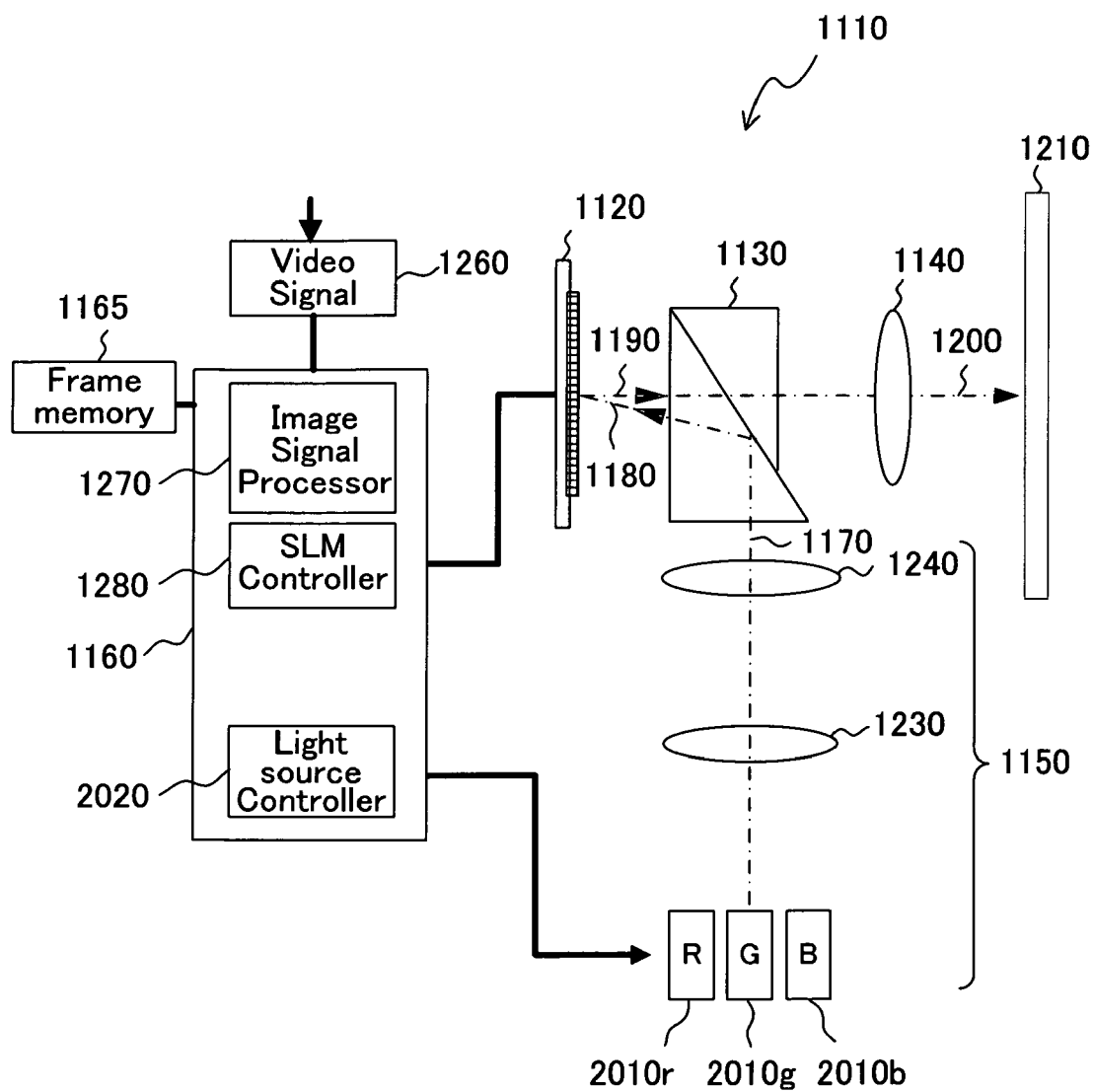
FIG. 21 is a diagram showing an example of applying a plurality of solid state light source as means for changing over the colors of illumination light.

Additionally, the changeover of the colors of the illumination light 1170 can also be carried out by using a plurality of solid state light sources 2010*r*, 2010*g*, and 2010*b*, which possess different wavelengths of emission lights, as shown in FIG. 21. The solid-state light sources 2010*r*, 2010*g*, and 2010*b* are light sources (e.g. semiconductor light sources) emitting the lights of the wavelengths of R, G, and B, respectively, and the emission of the individual light sources are changed over in sequence, and thereby the generation of a color sequential illumination light 1170 is enabled. Such a configuration eliminates the need for motor 1290 used for rotating the color wheel 1250 and the motor controller 1300 used for controlling the rotation of the motor 1290. Instead, the configuration is equipped with a light source controller 2020 used for changing over the emission of the individual of the plurality of solid state light sources in sequence, in place of the light source controller 1310 used for controlling the white light source 1220, associated with equipping the plurality of solid state light sources in place of the white light source 1220 as the light source. In this case, the light source controller 2020 controls the emission of each solid state light source in accordance with the SLM controller 1280 controlling the SLM 1120, thereby generating the color sequential illumination light 1170. Note that the plurality of solid state light sources may adopt, for example, a plurality of light emitting diode (LED) light sources or a plurality of laser light sources. When adopting the LED light source or laser light source for a light source as described above, the period for switching the emission is shortened and therefore the period (i.e., a transition period) for changing over the colors of the illumination light is also shortened, and the period in which a mixture of colors is generated is also shortened. The LED light source and laser light source, however, each possess a higher level of brightness immediately after the emission, thus generating a change in brightness in terms of the emission time. Consequently, if there is a change in the brightness even in a short period of time, color balance will be lost. Accordingly, in the case of applying the LED light source or laser light source as the light source, the applying of the above described modulation control according to the present embodiment enables a control so as to reduce the light volume of the modulation light (i.e., the reflection light) to a minimum, or to nearly zero, by means of the micromirror 1630, during a period in which the colors of the illumination light are changed over, thereby making it possible to display a fine video image.

Furthermore, the color display apparatus according to the present embodiment has been described as a configuration comprising a single SLM 1120; the modulation control is likewise enabled also for a configuration including a plurality of SLMs provided that it is an apparatus performing a color display by means of a color sequential method. For example, in a two-panel color display apparatus comprising two SLMs, the illumination light of the color G is incident to one SLM, while the illumination lights of the colors B and R are color-sequentially incident to the other SLM. In this case, a modulation control, such as the scheme applied to the above described transition period, can be applied as a modulation control applied during the period in which the colors of the illumination light incident to the other SLM are changed from B to R, or from R to B. FIGS. 22A, 22B, 22C, and 22D show an example configuration of such a two-panel color display apparatus, primarily showing the optical configuration thereof. Note that the example configuration adopts a laser light source as the light source.

Figure 22A:
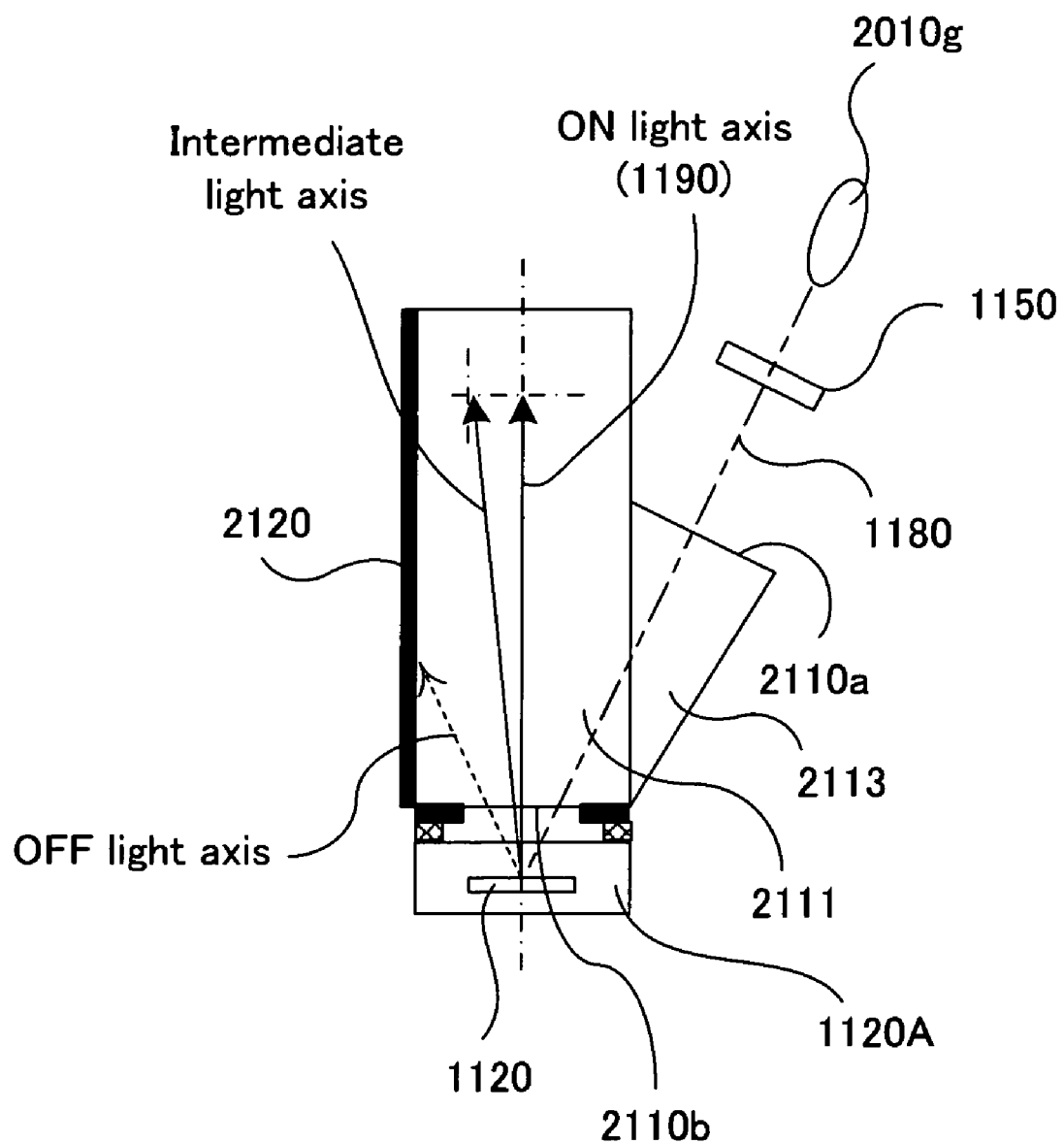
FIG. 22A is a side view diagram showing an example configuration of a two-panel color display apparatus.
Figure 22B:
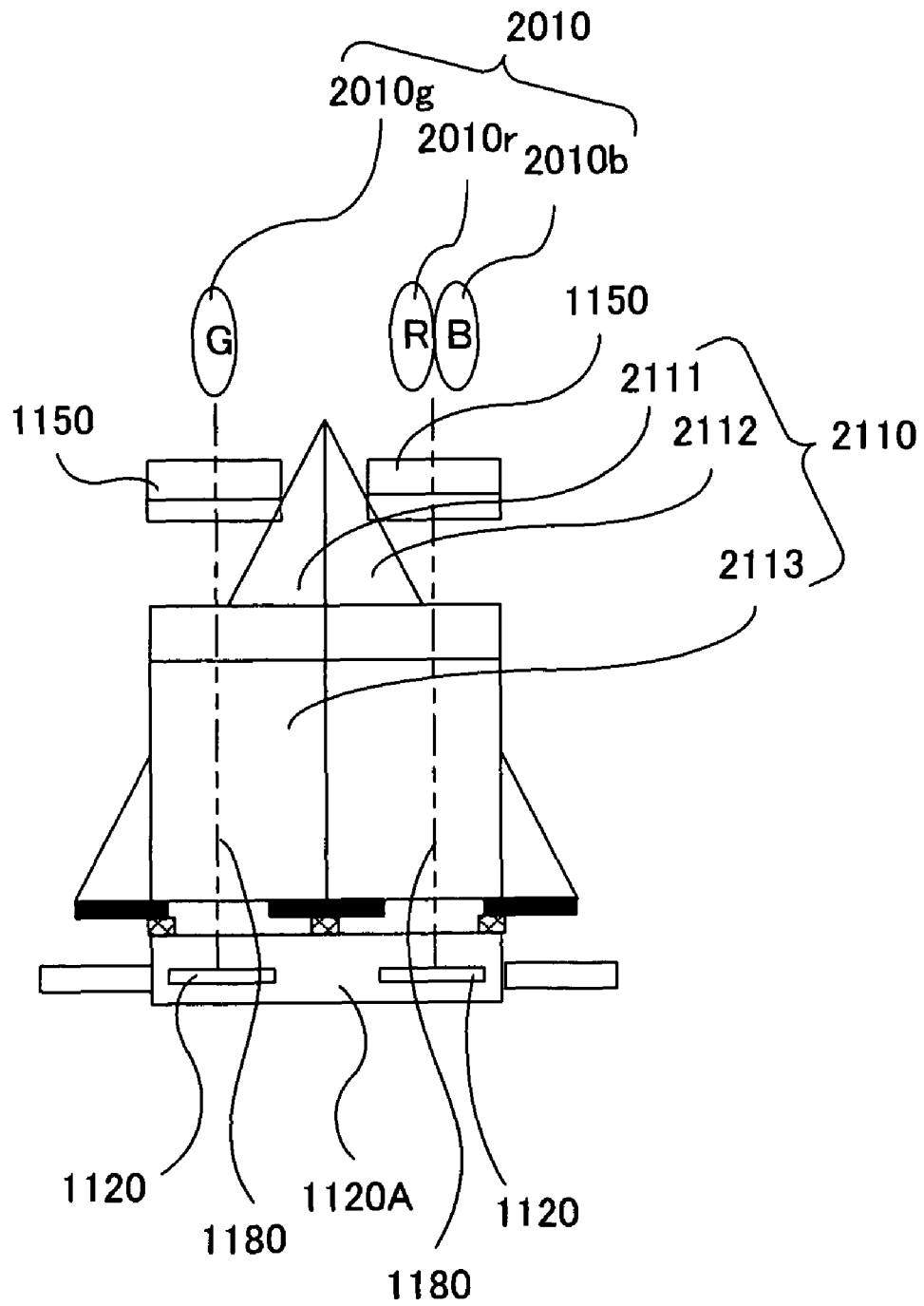
FIG. 22B is a front view diagram showing an example configuration of the two-panel color display apparatus.
Figure 22C:
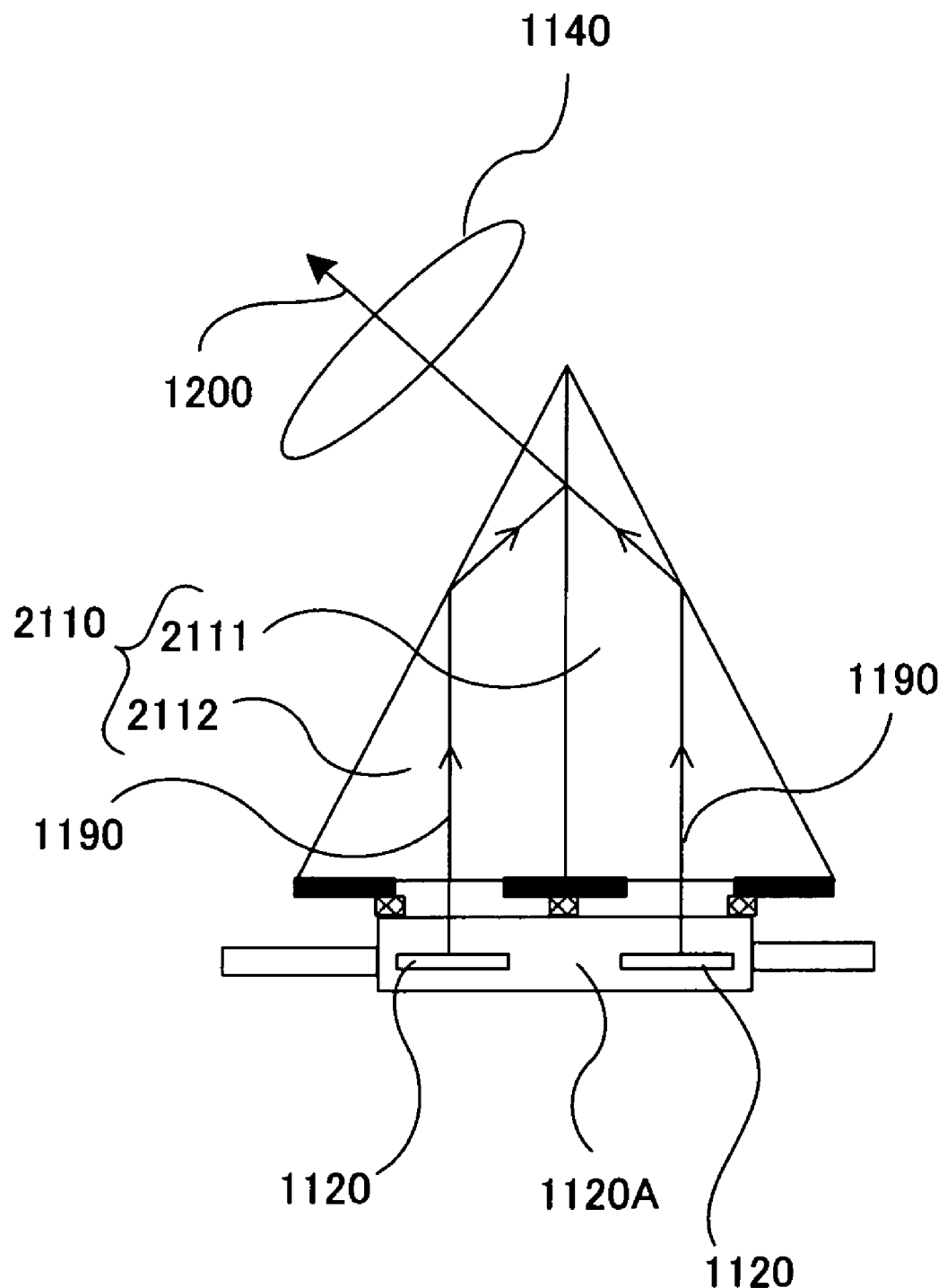
FIG. 22C is a rear view diagram showing an exemplary configuration of the two-panel color display apparatus.
Figure 22D:
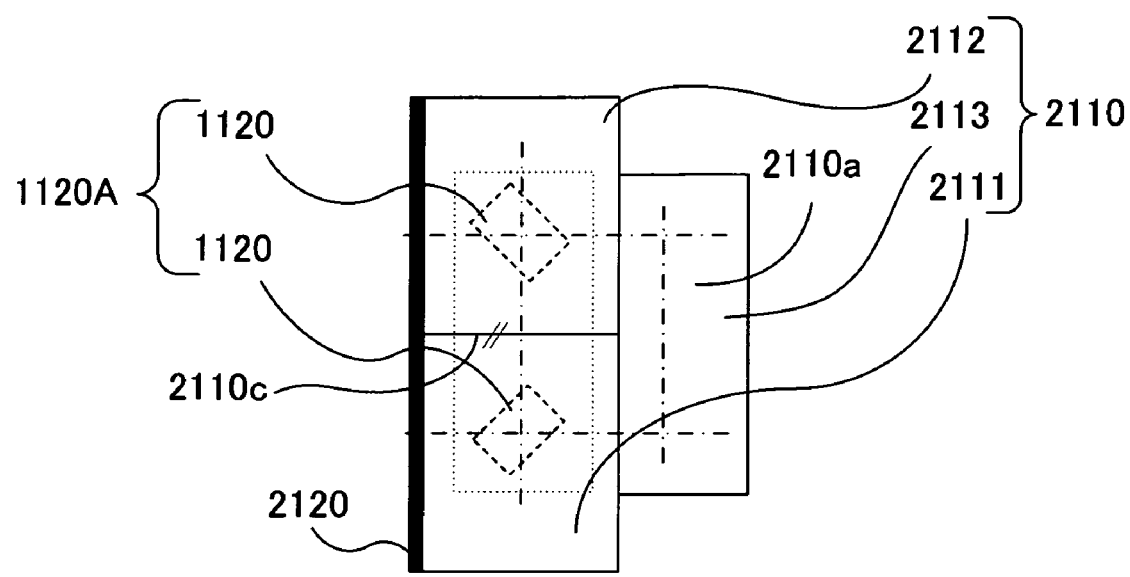
FIG. 22D is an upper plain view diagram showing an example configuration of the two-panel color display apparatus.

FIG. 22A is a side view diagram of the example configuration; FIG. 22B is a front view diagram thereof; FIG. 22C is a rear view diagram thereof; and FIG. 22D is an upper plain view diagram thereof.

The optical system included by the two-panel color display apparatus includes a device package 1120A integrating two SLMs 1120, a color synthesis optical system 2110, a light source optical system 1150, and a plurality of laser light sources 2010 (i.e., 2010*r*, 2010*g* and 2010*b*).

Two SLMs 1120 incorporated in the device package 1120A are fixed, with the rectangular contour of each SLM 1120 positioned at 45-degree inclination angle in the horizontal plane relative to each side of the device package 1120A, also having a rectangular contour.

The color synthesis optical system 2110 is placed on the device package 1120A. The color synthesis optical system 2110 includes right-angle triangle pole-shaped prisms 2111 and 2112, which are joined together so as to make an equilateral triangle column on their longitudinal sides, and a right-angle triangle column-shaped light guide block 2113, of which a slope surface is attached by adhesive to the side faces of the prisms 2111 and 2112, with the bottom surface of the light guide block 2113 facing up.

On the prisms 2111 and 2112, a light absorption body 2120 is equipped on the side surface on the reverse side of the face on which the light guide block 2113 is attached.

The bottom surface of the light guide block 2113 is equipped with the light source optical system 1150 of the green laser light source 2010*g*, the light source optical system 1150 of the red laser light source 2010*r*, and the blue laser light source 2010*b*, with the optical axis of each of the light source optical systems 1150 maintained at vertical.

Furthermore, the illumination light emitted from the green laser light source 2010*g* is incident to the SLM 1120, on one side, which is positioned immediately under the prism 2111, as an incident light 1180, by way of the light guide block 2113 and the present prism 2111.

Also, the illumination lights emitted from the red laser light source 2010*r* and blue laser light source 2010*b* are incident to the SLM 1120, on the other side, which is positioned immediately under the prism 2112, as the incident light 1180, by way of the light guide block 2113 and the present prism 2112.

The red and blue incident light 1180 incident to the SLM 1120 are reflected vertically upward, as reflection light 1190, in the prism 2112, and are further reflected by the external surface and adhesively attached surface, in this order, of the present prism 2112. They are then incident to the projection optical system 1140 and turned to be projection light 1200, in the ON state of a micromirror 1630.

Meanwhile, the green incident light 1180 incident to the SLM 1120 is reflected in a vertically upward direction as reflection light 1190 in the prism 2111, and is further reflected by the external surface of the present prism 2111 and led through the same light path as the red and blue reflection lights 1190 and is incident to the projection optical system 1140, in which the incident light is turned to be projection light 1200, in the ON state of the micromirror 1630.

As described above, the present embodiment is configured to accommodate two SLMs 1120 in a single device package 1120A. One SLM 1120 is illuminated only with the incident light 1180 emitted from the green laser light source 2010*g*. The other SLM 1120 is illuminated with the incident light 1180 emitted from the red laser light source 2010*r* and blue laser light source 2010*b* in color sequence. Individual modulation lights modulated by two SLMs 1120 are collected at the color synthesis optical system 2110 as described above. The collected light is further expanded by the projection optical system 1140, and is projected onto a screen or the like as the projection light 1200.

Another example of the color display apparatus according to the present embodiment is configured to include 1) a polarizing direction changeover unit for changing over the polarizing direction of an illumination light or projection light, 2) a control circuit for generating, from a video signal, a control signal in accordance with the polarizing direction changed over by the polarizing direction changeover unit, and 3) a spatial light modulator. In this configuration, the modulation of the spatial light modulator is controlled on the basis of a control signal generated by the control circuit in accordance with a first polarizing direction or second polarizing direction within the transition period in which the light of the first polarizing direction and that of the second polarizing direction coexist in the illumination light or projection light, when the polarizing direction changeover unit changes over the polarizing directions of the illumination light or projection light from the first polarizing direction to second polarizing direction. Specifically, the video signal is binary data, while the control signal is non-binary data. Meanwhile, the polarizing direction changeover unit can adopt a polarization element or an element using a wave plate. Furthermore, the illumination light is an illumination light that possesses a different polarizing direction for each color within the illumination light path.

More specifically, the individual exemplary configurations described above can also be applied by combining a few of them together on an as-needed basis.

As described above, the color display apparatus according to the present embodiment is configured to apply an oscillation modulation control for the micromirror 1630, during a transition period in which the illumination light is in the state of mixed colors, when the colors of the illumination light are changed over. This makes it possible to reduce the degree to which the color purity of a display video image is compromised. Furthermore, this control is not configured to not use the illumination light during the transition period, and therefore the brightness of the display video image is never sacrificed. Additionally, this control does not require a processing circuit for generating data for displaying a video image of white or a complementary color during the transition period, and therefore the comprisal remains simple. It is further possible to extend the display period of a primary color, enabling an increased level of gray scale in the display video image.

The present invention has so far been described. However, the present invention may of course be improved and modified in various ways possible within the scope and spirit of the present invention, while limited to the above described embodiments.

As described above, the present invention makes it possible to prevent color purity, in an apparatus performing a color display, from being degraded by changing over the color or polarizing direction of an illumination light or projection light.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A color display apparatus, comprising:
    a color changeover unit for changing over colors of an illumination light or a projection light, and
    a control circuit for applying a video signal for generating a control signal for controlling a spatial light modulator, wherein the control circuit generating the control signal corresponding to a first color or a second color during a transition period immediately at the end of a display frame period in transition to a next display frame period when the illumination and/or the projection light are projected with a first color overlapping with a second color as the color changeover unit changes over the colors of the illumination light or projection light from the first color to the second color at a beginning or an end point of the transition period.

2. The apparatus according to claim 1, wherein:
    said control circuit further receives the video signal as binary data for generating the control signal comprising non-binary data.

3. The apparatus according to claim 1, wherein:
the spatial light modulator applies data of a lower bit of the video signal to modulate the illumination light during the transition period when the color changeover unit changing the colors.

4. The apparatus according to claim 1, wherein:
the spatial light modulator comprising a mirror device comprising a plurality of micromirrors wherein each of said micromirrors is controlled to operate in three states for modulating and reflecting the illumination light having a maximum light intensity, an intermediate light intensity and a minimum light intensity.

5. The apparatus according to claim 1, wherein:
the spatial light modulator includes a plurality of pixel elements, wherein each of the pixel elements is controlled for generating an intermediate light intensity during the transition period when the color changeover unit changing the colors of the illumination light and/or the projection light.

6. The apparatus according to claim 1, wherein:
the spatial light modulator, including the plurality of pixel elements is implemented as a mirror device including a plurality of micromirrors, wherein each of the micromirrors is controlled to operate in an intermediate state between an ON state and an OFF state, when each of the pixel elements is controlled to generate an intermediate light intensity during a transition period when the color changeover unit changing the colors of the illumination light and/or the projection light.

7. The apparatus according to claim 1, wherein:
the color changeover unit comprises a color wheel or a wavelength selection switch element for changing over a wavelength transmitted through the element in the transition period immediately at the end of the display frame period in transition from the display frame period to the next display frame period.

8. The apparatus according to claim 1, wherein:
the color changeover unit comprises a rotation wheel comprising a plurality of wavelength-selective polarization element.

9. The apparatus according to claim 1, further comprising:
a plurality of semiconductor light sources for emitting illumination lights of different wavelengths, and
the color changeover unit comprises a light source control circuit for sequentially changing over lights emitted from each of the plurality of semiconductor light sources.

10. A color display apparatus, comprising:
a polarizing direction changeover unit for changing over a polarizing direction of an illumination light or a projection light,
a control circuit for applying a video signal for generating a control signal in accordance with the polarizing direction; and
a spatial light modulator, wherein the spatial light modulator applying the control signal generated by the control circuit corresponding to the polarization direction to modulate the illumination light in a transition modulation state during a transition period immediately at the end of a display frame period in transition to next display frame period for controlling when the polarizing direction changeover unit changes over the polarizing directions of the illumination light or projection light from a first polarizing direction to a second polarizing direction at a beginning or an end point of the transition period.

11. The apparatus according to claim 10, wherein:
said control circuit further receives the video signal as binary data for generating the control signal comprising non-binary data.

12. The apparatus according to claim 10, wherein:
the polarizing direction changeover unit comprises a polarization element or an element comprising a wave plate.

13. The apparatus according to claim 10, further comprising:
a light source for projecting the illumination light of different colors with each of said color projected with a different polarizing direction.

14. A method to display a color video image from a display apparatus comprising a spatial light modulator comprising:
applying a control signal corresponding to a first color or a second color to modulate the spatial light modulator during a first transition period when a light of a first color coexists with a second color in changing over from the first color to second color; and
the step of controlling the spatial light modulator further comprising a step of applying a second control signal corresponding to the second color different from the control signal to modulate the spatial light modulator when the light of the second color coexists with a third color when the light is changed over from the second color to the third color.

15. A method to display a color video image from display apparatus comprising a spatial light modulator comprising:
applying a second control signal corresponding to the second color generated in a first transition period when changing from a first color to a second color to control the spatial light modulator when a light of the first color coexists with the light of the second color in changing over from the first color to the second color, and
applying the second control signal generated in a second transition period when changing from the second color to a third color to control the spatial light modulator when the light of the second color coexists with the third color in changing over from the second color to the third color.

16. A method to display a color video image from a display apparatus comprising a spatial light modulator having a plurality of pixel elements comprising:
applying a video signal for controlling each of said pixel elements during a transition period immediately at the end of a display frame period in transition to next display frame period when changing from a first color with the light of the first color overlaps with the second color in changing over from the first color to the second color if a brightness of the video signal for the pixel element is greater than or equal to a predefined value, and
controlling the pixel element to operate in an OFF state during the transition period immediately at the end of the display frame period in transition to next display frame period if the brightness of the video signal for the pixel element is smaller than the predefined value.

17. The method according to claim 16, wherein:
The step of applying the video signal further comprising a step of applying a video signal comprising binary data, and
generating non-binary data from the binary data, wherein the step of applying the video signal to control the spatial light modulator further comprising a step of applying the non-binary data to control the spatial light modulator.

18. A color display apparatus, comprising:
a color changeover unit for changing over the colors of an illumination light or projection light, and a spatial light modulator for applying a video signal to modulate the illumination light by modulating the illumination light of different colors in synchronization with the color changeover unit in changing between light of the different colors, and wherein the color changeover unit further changes between the different colors in synchronization with a beginning or an end point of a transition period immediately at the end of a display frame period in transition from the display frame period to a next display frame period with at least two of said different colors overlapping with each other.

19. The color display apparatus according to claim 18, wherein:

the color changeover unit further controls the colors of the illumination light or projection light to adjust a timing of color changeover to synchronize with the spatial light modulator depending on a changeover of the different colors.

20. A method to display a color video image from a display apparatus comprising a spatial light modulator having a plurality of pixel elements comprising:

applying a first control signal corresponding to a first color to modulate the spatial light modulator during a first transition period when a light of a first color overlaps with a second color in changing over from the first color to second color; and applying a second control signal corresponding to a third color to modulate the spatial light modulator during a second transition period when a light of the second color overlaps with the third color in changing over from the second color to third color.

* * * * *